(12) United States Patent
Sumiya et al.

(10) Patent No.: US 8,496,849 B2
(45) Date of Patent: *Jul. 30, 2013

(54) LIQUID CRYSTAL ALIGNING AGENT, LIQUID CRYSTAL ALIGNMENT FILM AND LIQUID CRYSTAL DISPLAY DEVICE

(75) Inventors: Kenichi Sumiya, Tokyo (JP); Toshiyuki Akiike, Tokyo (JP); Tsutomu Kumagai, Tokyo (JP); Eiji Hayashi, Tokyo (JP)

(73) Assignee: JSR Corporation, Tokyo (JP)

( * ) Notice: Subject to any disclaimer, the term of this patent is extended or adjusted under 35 U.S.C. 154(b) by 234 days.

This patent is subject to a terminal disclaimer.

(21) Appl. No.: 12/865,535

(22) PCT Filed: Jan. 29, 2009

(86) PCT No.: PCT/JP2009/051920
§ 371 (c)(1),
(2), (4) Date: Nov. 8, 2010

(87) PCT Pub. No.: WO2009/096598
PCT Pub. Date: Aug. 6, 2009

(65) Prior Publication Data
US 2011/0043739 A1  Feb. 24, 2011

(30) Foreign Application Priority Data
Jan. 30, 2008 (JP) ................... 2008-019346

(51) Int. Cl.
C09K 19/56 (2006.01)
C09K 19/40 (2006.01)
C08G 77/14 (2006.01)

(52) U.S. Cl.
USPC ..... 252/299.4; 428/1.23; 428/1.25; 428/1.26; 528/26; 427/515

(58) Field of Classification Search
USPC ............. 252/299.4; 428/1.1, 1.23, 1.25, 1.26; 525/431, 477; 427/515; 528/26
See application file for complete search history.

(56) References Cited

U.S. PATENT DOCUMENTS

| | | | |
|---|---|---|---|
| 4,410,570 A | 10/1983 | Kreuzer et al. | |
| 4,469,409 A | 9/1984 | Nakano et al. | |
| 5,766,673 A | 6/1998 | Nogami et al. | |
| 5,824,377 A | 10/1998 | Pirwitz | |
| 5,998,563 A | 12/1999 | Pirwitz et al. | |
| 8,216,649 B2 * | 7/2012 | Akiike et al. | 428/1.1 |
| 8,304,031 B2 * | 11/2012 | Akiike et al. | 427/489 |
| 8,399,068 B2 * | 3/2013 | Akiike et al. | 427/508 |
| 2004/0209008 A1 | 10/2004 | Liang et al. | |
| 2006/0222785 A1 | 10/2006 | Kurosawa | |
| 2007/0098921 A1 | 5/2007 | Liang et al. | |
| 2008/0272334 A1 | 11/2008 | Liang et al. | |
| 2011/0068301 A1 * | 3/2011 | Akiike et al. | 252/299.4 |
| 2011/0105700 A1 * | 5/2011 | Akiike et al. | 525/449 |
| 2011/0118422 A1 * | 5/2011 | Akiike et al. | 525/431 |

FOREIGN PATENT DOCUMENTS

| | | |
|---|---|---|
| EP | 1 818 354 A2 | 8/2007 |
| EP | 1 818 354 A3 | 8/2007 |
| JP | 58 33217 | 2/1983 |
| JP | 63-291922 | 11/1988 |
| JP | 5-107544 | 4/1993 |
| JP | 6-222366 | 8/1994 |
| JP | 6-281937 | 10/1994 |
| JP | 9-197411 | 7/1997 |
| JP | 9 278890 | 10/1997 |
| JP | 9-281502 | 10/1997 |
| JP | 2003-107486 | 4/2003 |
| JP | 2003-149648 | 5/2003 |
| JP | 2006 276501 | 10/2006 |

OTHER PUBLICATIONS

U.S. Appl. No. 12/674,537, filed Feb. 22, 2010, Akiike, et al.
U.S. Appl. No. 12/674,479, filed Feb. 22, 2010, Akiike, et al.
Jia Liu, et al., "Novel Photoalignment Materials for Liquid Crystals Based on Modified Polysiloxane", Japanese Journal of Applied Physics, XP008129818, vol. 39, No. 3A, Mar. 2000, pp. 1221-1224.
A. Petri, et al., "Photoinduced Reorientation of Cholesteric Liquid Crystalline Polysiloxanes and Applications in Optical Information Storage and Second Harmonic Generation", Ber. Bunsenges. Phys. Chem., XP008072841, vol. 97, No. 10, Jan. 1, 1993, pp. 1281-1286 (corresponding to US 4,410,570).
Supplementary Search Report issued Feb. 22, 2011 in European Patent Application No. 09705675.8-1214 / 2256541.
Ronald H. Baney, et al., "Silsesquioxanes", Chemical Reviews, vol. 95, 1995, pp. 1409-1431.

* cited by examiner

Primary Examiner — Shean C Wu
(74) Attorney, Agent, or Firm — Oblon, Spivak, McClelland, Maier & Neustadt, L.L.P.

(57) ABSTRACT

Disclosed is a liquid crystal orientating agent which contains a liquid crystal orientating polyorganosiloxane obtained by reacting a specified reactive polyorganosiloxane typified by the hydrolysis condensate of 2-(3,4-epoxycyclohexyl)ethyltrimethoxysilane and a reactive compound which includes a specified compound typified by stearic acid. The liquid crystal orientating agent of this invention can form liquid crystal orientating films which have excellent liquid crystal orientating properties, a high level of heat resistance and light resistance, exhibit little reduction of voltage retention even in high temperature environments and when irradiated with light of high intensity, and excellent residual image characteristics, and it also has excellent storage stability.

10 Claims, No Drawings

LIQUID CRYSTAL ALIGNING AGENT, LIQUID CRYSTAL ALIGNMENT FILM AND LIQUID CRYSTAL DISPLAY DEVICE

TECHNICAL FIELD

The present invention relates to a liquid crystal aligning agent, a liquid crystal alignment film and a liquid crystal display device. More specifically, it relates to a liquid crystal aligning agent which can provide a liquid crystal alignment film having high liquid crystal alignability and capable of maintaining a liquid crystal aligned state well without impairing electric properties such as voltage holding ratio even after it is used, stored or driven for a long time in an extreme environment such as exposure to strong radiation or a high temperature and hardly developing an after-image phenomenon and which has excellent storage stability, a liquid crystal alignment film formed therefrom and a liquid crystal display device comprising the liquid crystal alignment film.

BACKGROUND ART

As a liquid crystal display device, there is currently known a TN (Twisted Nematic) liquid crystal display device having a so-called TN liquid crystal cell which is obtained by forming a liquid crystal alignment film from an organic resin on the surface of a substrate having a transparent conductive film to produce a substrate for a liquid crystal display device, opposing two of the substrates to each other, forming a nematic liquid crystal layer having positive dielectric anisotropy in the gap between the two substrates to fabricate a sandwich-structured cell and twisting the long axis of each liquid crystal molecule at 90° continuously from one substrate to the other. Further, an STN (Super Twisted Nematic) liquid crystal display device which can achieve a higher contrast ratio than that of the TN liquid crystal display device, an IPS (In-Plane Switching) liquid crystal display device which has little dependence upon the view angle and a VA (Vertical Alignment) liquid crystal display device which comprises nematic liquid crystals having negative dielectric anisotropy have been developed.

The operation principles of these liquid crystal display devices are roughly divided into a transmission type and a reflection type. The transmission type liquid crystal display device displays, making use of a change in the intensity of light from a backlight source transmitted from the rear of the device at the time of driving the device. The reflection type liquid crystal display device displays, making use of a change in the intensity of reflected light from the outside such as sunlight at the time of driving the device without using a backlight source. Therefore, it is considered that this reflection type liquid crystal display device is especially advantageous when it is used outdoors as its power consumption is lower than that of the transmission type liquid crystal display device.

In the transmission type liquid crystal display device, a liquid crystal alignment film provided in the device is exposed to light from the backlight source for a long time. Especially in the application of the transmission type liquid crystal display device in a liquid crystal projector which is now in growing demand as a home theater in addition to its business application, a light source having very high irradiation intensity such as a metal halide lamp is used. It is also conceivable that the temperature of the liquid crystal display device itself rises at the time of driving due to the application of light having high intensity.

It is most likely that the reflection type liquid crystal display device is used outdoors. In this case, sunlight including strong ultraviolet radiation is a light source. The distance of light passing through the reflection type liquid crystal display device is longer than that of the transmission type liquid crystal display device theoretically.

Further, there is a trend toward the use of both the transmission type liquid crystal display device and the reflection type liquid crystal display device in private vehicles, and the use and installation environment of these display devices at a high temperature is becoming realistic as compared with the conventional use and installation environment of a liquid crystal display device.

In the production process of the liquid crystal display device, a liquid crystal dropping process, that is, ODF (One Drop Fill) process has begun to be used to shorten the process and improve the yield. In the ODF process, unlike the prior art process in which liquid crystals are injected into an empty liquid crystal cell assembled by using a thermosetting sealing agent, an ultraviolet curable sealing agent is applied to a required position of one substrate on which a liquid crystal alignment film has been formed, liquid crystals are dropped on required positions, the other substrate is joined to the above substrate, and ultraviolet radiation is applied to the entire surface of the obtained assembly to cure the sealing agent so as to fabricate a liquid crystal cell. The ultraviolet radiation to be applied at this point is usually strong with several Joule or more per $cm^2$. That is, in the production process of the liquid crystal display device, the liquid crystal alignment film is exposed to this strong ultraviolet radiation together with the liquid crystals.

Thus, the liquid crystal display device is exposed to a harsh environment which has been inconceivable in the prior art, such as the application of high-intensity light, a high-temperature environment and long-term drive as it is more functional and used for more purposes and its production process is improved more. Even under the above environment, higher liquid crystal alignability, electric properties such as voltage holding ratio and higher display properties than those of the prior art are required and further longer service life is required for the liquid crystal display device.

As the material of the liquid crystal alignment film constituting the liquid crystal display device, there have been known organic resins such as polyimides, polyamic acids, polyamides and polyesters. In organic resins, especially polyimides have been used in many liquid crystal display devices because they have excellent physical properties such as heat resistance, affinity for liquid crystals and mechanical strength (refer to JP-A 9-197411, JP-A 2003-149648 and JP-A 2003-107486).

However, new requirements are becoming stronger for the liquid crystal display devices of these days due to the above harsh production environment and use environment, whereby the conventionally accepted heat resistance and light resistance which can be achieved by organic resins have become unsatisfactory.

Then, a liquid crystal alignment film having excellent heat resistance and light resistance is now under study. For example, JP-A 9-281502 discloses a homeotropic alignment type liquid crystal alignment film which is formed from a polysiloxane solution obtained from a silicon compound having 4 alkoxyl groups and a silicon compound having 3 alkoxyl groups and teaches that the film is excellent in homeotropic alignability, heat resistance and homogeneity and that the coating solution has high stability.

However, as the liquid crystal alignment film formed by the technology of JP-A 9-281502 does not satisfy the requirements from the current harsh production environment and use environment and the storage stability of the coating solution is unsatisfactory, it has a problem with convenience when it is industrially used.

A liquid crystal aligning agent which can provide a liquid crystal alignment film having sufficiently high heat resistance and light resistance even in the current very harsh production environment and use environment and which has excellent storage stability is not known yet.

DISCLOSURE OF THE INVENTION

It is an object of the present invention which has been made in view of the above situation to provide a liquid crystal aligning agent which can provide a liquid crystal alignment film having excellent liquid crystal alignability, high heat resistance and light resistance, little reduction in voltage holding ratio even when it is exposed to light having high intensity in a high-temperature environment and excellent after-image property and which has excellent storage stability.

It is another object of the present invention to provide a liquid crystal alignment film having the above excellent properties by using the liquid crystal aligning agent of the present invention.

It is still another object of the present invention to provide a liquid crystal display device having excellent heat resistance and light resistance.

Other objects and advantages of the present invention will become apparent from the following description.

According to the present invention, firstly, the above objects and advantages of the present invention are attained by a liquid crystal aligning agent comprising a liquid crystal aligning polyorganosiloxane obtained by reacting a reactive polyorganosiloxane (this reactive polyorganosiloxane has a group $X^1$ content of 0.0001 to 0.02 mole/g and a weight average molecular weight in terms of polystyrene measured by gel permeation chromatography of 200 to 100,000) which is at least one selected from the group consisting of a polyorganosiloxane having a recurring unit represented by the following formula (S-1), a hydrolysate thereof and a condensate of the hydrolysate with a reactive compound including at least a compound represented by the following formula (1):

(in the above formula (S-1), $Y^1$ is a hydroxyl group, alkyl group having 1 to 20 carbon atoms, alkoxyl group having 1 to 10 carbon atoms or aryl group having 6 to 20 carbon atoms, and in the above formula (1), $A^1$ is an alkyl group having 1 to 20 carbon atoms, cycloalkyl group having 5 to 10 carbon atoms which may be substituted by an alkyl group or alkoxyl group having 1 to 20 carbon atoms, hydrocarbon group having 17 to 51 carbon atoms and a steroid skeleton, $L^0$ is a single bond, *—O—, *—COO— or *—OCO— (the bond marked with "*" is bonded to $A^1$), and $L^1$ is a single bond, phenylene group, biphenylene group, cyclohexylene group, bicyclohexylene group or group represented by the following formula ($L^1$-1) or ($L^1$-2):

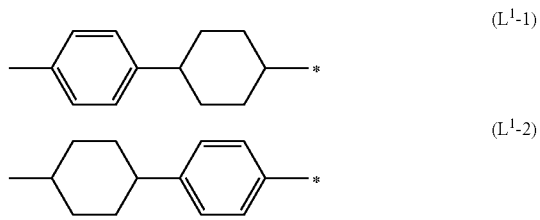

(in the above formulas ($L^1$-1) and ($L^1$-2), the bond marked with "*" is bonded to Z)

with the proviso that when $L^1$ is a single bond, $L^0$ is a single bond, and $X^1$ in the formula (S-1) and Z in the formula (1) are monovalent organic groups which may be reacted with each other to form a bond group).

Secondly, the above objects and advantages of the present invention are attained by a liquid crystal alignment film formed from the above liquid crystal aligning agent.

Thirdly, the above objects and advantages of the present invention are attained by a liquid crystal display device comprising the above liquid crystal alignment film.

BEST MODE FOR CARRYING OUT THE INVENTION

The present invention will be described in detail hereinunder.

<Liquid Crystal Aligning Agent>

The liquid crystal aligning agent of the present invention comprises a liquid crystal aligning polyorganosiloxane obtained by reacting at least one (to be referred to as "reactive polyorganosiloxane" hereinafter) selected from the group consisting of a polyorganosiloxane having a recurring unit represented by the above formula (S-1), a hydrolysate thereof and a condensate of the hydrolysate with a reactive compound including at least a compound represented by the above formula (1) (to be referred to as "compound (1)" hereinafter).

<Reactive Polyorganosiloxane>

The reactive polyorganosiloxane used in the present invention is at least one selected from the group consisting of a polyorganosiloxane having a recurring unit represented by the above formula (S-1), a hydrolysate thereof and a condensate of the hydrolysate.

Examples of $X^1$ in the above reactive polyorganosiloxane include a monovalent group having an epoxy group, a monovalent group having a vinyl group, a monovalent group having a (meth)acryloyloxyl group, a monovalent group having a mercapto group, and a hydrogen atom. The above epoxy group includes an oxiranyl group (having a 1,2-epoxy structure) and an oxetanyl group (having a 1,3-epoxy structure).

$X^1$ in the above reactive polyorganosiloxane is preferably a monovalent group having an epoxy group, particularly preferably a group represented by the following formula ($X^1$-1) or ($X^1$-2).

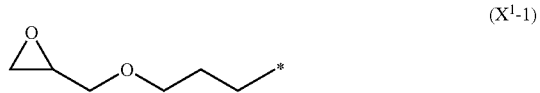

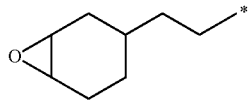

(X¹-2)

(in the above formulas, "*" is a bond.)

Examples of the alkoxyl group having 1 to 10 carbon atoms of $Y^1$ include methoxyl group, ethoxyl group; examples of the alkyl group having 1 to 20 carbon atoms include methyl group, ethyl group, n-propyl group, n-butyl group, n-pentyl group, n-hexyl group, n-heptyl group, n-octyl group, n-nonyl group, n-decyl group, n-lauryl group, n-dodecyl group, n-tridecyl group, n-tetradecyl group, n-pentadecyl group, n-hexadecyl group, n-heptadecyl group, n-octadecyl group, n-nonadecyl group and n-eicosyl group; and examples of the aryl group having 6 to 20 carbon atoms include phenyl group.

The content of the group $X^1$ in the reactive polyorganosiloxane is 0.0001 to 0.02 mole/g, preferably 0.0001 to 0.01 mole/g, more preferably 0.001 to 0.0075 mole/g. When the group $X^1$ is a group having an epoxy group, the inverse of the content of this group $X^1$ is equal to the epoxy equivalent of the reactive polyorganosiloxane.

The reactive polyorganosiloxane has a weight average molecular weight in terms of polystyrene measured by gel permeation chromatography (GPC) of 500 to 100,000, preferably 1,000 to 30,000, more preferably 1,000 to 10,000.

This preferred reactive polyorganosiloxane can be synthesized preferably by hydrolyzing or hydrolyzing/condensing a silane compound having an epoxy group or a mixture of a silane compound having an epoxy group and another silane compound preferably in the presence of a suitable organic solvent, water and a catalyst.

Examples of the above silane compound having an epoxy group include 3-glycidoxypropyl trimethoxysilane, 3-glycidoxypropyl triethoxysilane, 3-glycidoxypropylmethyl dimethoxysilane, 3-glycidoxypropylmethyl diethoxysilane, 3-glycidoxypropyldimethyl methoxysilane, 3-glycidoxypropyldimethyl ethoxysilane, 2-(3,4-epoxycyclohexyl)ethyl trimethoxysilane and 2-(3,4-epoxycyclohexyl)ethyl triethoxysilane.

Examples of the above another silane compound include silane compounds having one silicon atom such as tetrachlorosilane, tetramethoxysilane, tetraethoxysilane, tetra-n-propoxysilane, tetra-i-propoxysilane, tetra-n-butoxysilane, tetra-sec-butoxysilane, trichlorosilane, trimethoxysilane, triethoxysilane, tri-n-propoxysilane, tri-i-propoxysilane, tri-n-butoxysilane, tri-sec-butoxysilane, fluorotrichlorosilane, fluorotrimethoxysilane, fluorotriethoxysilane, fluorotri-n-propoxysilane, fluorotri-i-propoxysilane, fluorotri-n-butoxysilane, fluorotri-sec-butoxysilane, methyl trichlorosilane, methyl trimethoxysilane, methyl triethoxysilane, methyl tri-n-propoxysilane, methyl tri-i-propoxysilane, methyl tri-n-butoxysilane, methyl tri-sec-butoxysilane, 2-(trifluoromethyl)ethyl trichlorosilane, 2-(trifluoromethyl)ethyl trimethoxysilane, 2-(trifluoromethyl)ethyl triethoxysilane, 2-(trifluoromethyl)ethyl tri-n-propoxysilane, 2-(trifluoromethyl)ethyl tri-i-propoxysilane, 2-(trifluoromethyl)ethyl tri-n-butoxysilane, 2-(trifluoromethyl)ethyl tri-sec-butoxysilane, 2-(perfluoro-n-hexyl)ethyl trichlorosilane, 2-(perfluoro-n-hexyl)ethyl trimethoxysilane, 2-(perfluoro-n-hexyl)ethyl triethoxysilane, 2-(perfluoro-n-hexyl)ethyl tri-n-propoxysilane, 2-(perfluoro-n-hexyl)ethyl tri-i-propoxysilane, 2-(perfluoro-n-hexyl)ethyl tri-n-butoxysilane, 2-(perfluoro-n-hexyl)ethyl tri-sec-butoxysilane, 2-(perfluoro-n-octyl)ethyl trichlorosilane, 2-(perfluoro-n-octyl)ethyl trimethoxysilane, 2-(perfluoro-n-octyl)ethyl triethoxysilane, 2-(perfluoro-n-octyl)ethyl tri-n-propoxysilane, 2-(perfluoro-n-octyl)ethyl tri-i-propoxysilane, 2-(perfluoro-n-octyl)ethyl tri-n-butoxysilane, 2-(perfluoro-n-octyl)ethyl tri-sec-butoxysilane, hydroxymethyl trichlorosilane, hydroxymethyl trimethoxysilane, hydroxyethyl trimethoxysilane, hydroxymethyl tri-n-propoxysilane, hydroxymethyl tri-i-propoxysilane, hydroxymethyl tri-n-butoxysilane, hydroxymethyl tri-sec-butoxysilane, 3-(meth)acryloxypropyltrichlosilane, 3-(meth)acryloxypropyltrimethoxysilane, 3-(meth)acryloxypropyltriethoxysilane, 3-(meth)acryloxypropyltri-n-propoxysilane, 3-(meth)acryloxypropyltri-i-propoxysilane, 3-(meth)acryloxypropyltri-n-butoxysilane, 3-(meth)acryloxypropyltri-sec-butoxysilane, 3-mercaptopropyltrichlorosilane, 3-mercaptopropyltrimethoxysilane, 3-mercaptopropyltriethoxysilane, 3-mercaptopropyltri-n-propoxysilane, 3-mercaptopropyltri-i-propoxysilane, 3-mercaptopropyltri-n-butoxysilane, 3-mercaptopropyltri-sec-butoxysilane, mercaptomethyltrimethoxysilane, mercaptomethyltriethoxysilane, vinyl trichlorosilane, vinyl trimethoxysilane, vinyl triethoxysilane, vinyl tri-n-propoxysilane, vinyl tri-i-propoxysilane, vinyl tri-n-butoxy silane, vinyl tri-sec-butoxysilane, allyl trichlorosilane, allyl trimethoxysilane, allyl triethoxysilane, allyl tri-n-propoxysilane, allyl tri-i-propoxysilane, allyl tri-n-butoxysilane, allyl tri-sec-butoxysilane, phenyl trichlorosilane, phenyl trimethoxysilane, phenyl triethoxysilane, phenyl tri-n-propoxysilane, phenyl tri-i-propoxysilane, phenyl tri-n-butoxysilane, phenyl tri-sec-butoxysilane, methyl dichlorosilane, methyl dimethoxysilane, methyl diethoxysilane, methyl di-n-propoxysilane, methyl di-i-propoxysilane, methyl di-n-butoxysilane, methyl di-sec-butoxysilane, dimethyl dichlorosilane, dimethyl dimethoxysilane, dimethyl diethoxysilane, dimethyl di-n-propoxysilane, dimethyl di-i-propoxysilane, dimethyl di-n-butoxysilane, dimethyl di-sec-butoxysilane, (methyl)[2-(perfluoro-n-octyl)ethyl]dichlorosilane, (methyl)[2-(perfluoro-n-octyl)ethyl]dimethoxysilane, (methyl)[2-(perfluoro-n-octyl)ethyl]diethoxysilane, (methyl)[2-(perfluoro-n-octyl)ethyl]di-n-propoxysilane, (methyl)[2-(perfluoro-n-octyl)ethyl]di-i-propoxysilane, (methyl)[2-(perfluoro-n-octyl)ethyl]di-n-butoxysilane, (methyl) [2-(perfluoro-n-octyl)ethyl]di-sec-butoxysilane, (methyl)(3-mercaptopropyl)dichlorosilane, (methyl)(3-mercaptopropyl) dimethoxysilane, (methyl)(3-mercaptopropyl) diethoxysilane, (methyl)(3-mercaptopropyl)di-n-propoxysilane, (methyl)(3-mercaptopropyl)di-i-propoxysilane, (methyl)(3-mercaptopropyl)di-n-butoxysilane, (methyl)(3-mercaptopropyl)di-sec-butoxysilane, (methyl)(vinyl)dichlorosilane, (methyl)(vinyl) dimethoxysilane, (methyl)(vinyl)diethoxysilane, (methyl) (vinyl)di-n-propoxysilane, (methyl)(vinyl)di-i-propoxysilane, (methyl)(vinyl)di-n-butoxysilane, (methyl) (vinyl)di-sec-butoxysilane, divinyl dichlorosilane, divinyl dimethoxysilane, divinyl diethoxysilane, divinyl di-n-propoxysilane, divinyl di-i-propoxysilane, divinyl di-n-butoxysilane, divinyl di-sec-butoxysilane, diphenyl dichlorosilane, diphenyl dimethoxysilane, diphenyl diethoxysilane, diphenyl di-n-propoxysilane, diphenyl di-i-propoxysilane, diphenyl di-n-butoxysilane, diphenyl di-sec-butoxysilane, chlorodimethylsilane, methoxydimethylsilane, ethoxydimethylsilane, chlorotrimethylsilane, bromotrimethylsilane, iodotrimethylsilane, methoxytrimethylsilane, ethoxytrimethylsilane, n-propoxytrimethylsilane, i-propoxytrimethylsilane, n-butoxytrimethylsilane, sec-butoxytrimethylsilane, t-butoxytrimethylsilane, (chloro)(vinyl)dimethylsilane, (methoxy)(vinyl)dimethylsilane, (ethoxy)(vinyl)dimethylsilane, (chloro)

(methyl)diphenylsilane, (methoxy)(methyl)diphenylsilane and (ethoxy)(methyl)diphenylsilane; and partial condensates under the trade names of KC-89, KC-89S, X-21-3153, X-21-5841, X-21-5842, X-21-5843, X-21-5844, X-21-5845, X-21-5846, X-21-5847, X-21-5848, X-22-160AS, X-22-170B, X-22-170BX, X-22-170D, X-22-170DX, X-22-176B, X-22-176D, X-22-176DX, X-22-176F, X-40-2308, X-40-2651, X-40-2655A, X-40-2671, X-40-2672, X-40-9220, X-40-9225, X-40-9227, X-40-9246, X-40-9247, X-40-9250, X-40-9323, X-41-1053, X-41-1056, X-41-1805, X-41-1810, KF6001, KF6002, KF6003, KR212, KR-213, KR-217, KR220L, KR242A, KR271, KR282, KR300, KR311, KR401N, KR500, KR510, KR5206, KR5230, KR5235, KR9218 and KR9706 (of Shin-Etsu Chemical Co., Ltd.); Glass Resin (of Showa Denko K.K.); SH804, SH805, SH806A, SH840, SR2400, SR2402, SR2405, SR2406, SR2410, SR2411, SR2416 and SR2420 (of Dow Corning Toray Co., Ltd.); FZ3711 and FZ3722 (of Nippon Unicar Company Limited); DMS-S12, DMS-S15, DMS-S21, DMS-S27, DMS-S31, DMS-S32, DMS-S33, DMS-S35, DMS-S38, DMS-S42, DMS-S45, DMS-S51, DMS-227, PSD-0332, PDS-1615, PDS-9931 and XMS-5025 (of Chisso Corporation); Methyl Silicate MS51 and Methyl Silicate MS56 (of Mitsubishi Chemical Corporation); Ethyl Silicate 28, Ethyl Silicate 40 and Ethyl Silicate 48 (of Colcoat Co., Ltd.); and GR100, GR650, GR908 and GR950 (of Showa Denko K.K.).

Out of these silane compounds, preferred are tetramethoxysilane, tetraethoxysilane, methyl trimethoxysilane, methyl triethoxysilane, 3-(meth)acryloxypropyltrimethoxysilane, 3-(meth)acryloxypropyltriethoxysilane, vinyl trimethoxysilane, vinyl triethoxysilane, allyl trimethoxysilane, allyl triethoxysilane, phenyl trimethoxysilane, phenyl triethoxysilane, 3-mercaptopropyltrimethoxysilane, 3-mercaptopropyltriethoxysilane, mercaptomethyltrimethoxysilane, mercaptomethyltriethoxysilane, dimethyl dimethoxysilane and dimethyl diethoxysilane.

The reactive polyorganosiloxane used in the present invention is preferably a polyorganosiloxane having the above epoxy equivalent. To synthesize the preferred reactive polyorganosiloxane, the ratio of the silane compound having an epoxy group to the another silane compound should be set to ensure that the epoxy equivalent of the obtained polyorganosiloxane falls within the above range.

The organic solvent which can be used to synthesize the reactive polyorganosiloxane is selected from a hydrocarbon, ketone, ester, ether and alcohol.

Examples of the above hydrocarbon include toluene and xylene; examples of the above ketone include methyl ethyl ketone, methyl isobutyl ketone, methyl n-amyl ketone, diethyl ketone and cyclohexanone; examples of the above ester include ethyl acetate, n-butyl acetate, i-amyl acetate, propylene glycol monomethyl ether acetate, 3-methoxybutyl acetate and ethyl lactate; examples of the above ether include ethylene glycol dimethyl ether, ethylene glycol diethyl ether, tetrahydrofuran and dioxane; and examples of the above alcohol include 1-hexanol, 4-methyl-2-pentanol, ethylene glycol monomethyl ether, ethylene glycol monoethyl ether, ethylene glycol mono-n-propyl ether, ethylene glycol mono-n-butyl ether, propylene glycol monomethyl ether, propylene glycol monoethyl ether and propylene glycol mono-n-propyl ether. Out of these, water-insoluble organic solvents are preferred.

These organic solvents may be used alone or in combination of two or more.

The amount of the organic solvent is preferably 10 to 10,000 parts by weight, more preferably 50 to 1,000 parts by weight based on 100 parts by weight of the total of all the silane compounds.

The amount of water used to produce the reactive polyorganosiloxane is preferably 0.5 to 100 times, more preferably 1 to 30 times the total molar amount of all the silane compounds.

As the above catalyst may be used an acid, alkali metal compound, organic base, titanium compound or zirconium compound.

Examples of the above alkali metal compound include sodium hydroxide, potassium hydroxide, sodium methoxide, potassium methoxide, sodium ethoxide and potassium ethoxide.

Examples of the above organic base include primary and secondary organic amines such as ethylamine, diethylamine, piperazine, piperidine, pyrrolidine and pyrrole; tertiary organic amines such as triethylamine, tri-n-propylamine, tri-n-butylamine, pyridine, 4-dimethylaminopyridine and diazabicycloundecene; and quaternary organic amines such as tetramethylammonium hydroxide. Out of these organic bases, tertiary organic amines such as triethylamine, tri-n-propylamine, tri-n-butylamine, pyridine and 4-dimethylaminopyridine; and quaternary organic amines such as tetramethylammonium hydroxide are preferred.

The catalyst which is used to produce the reactive polyorganosiloxane is preferably an alkali metal compound or an organic base. When an alkali metal compound or an organic base is used as the catalyst, a polyorganosiloxane of interest can be obtained at a high hydrolysis/condensation rate without producing a side reaction such as the ring-opening of an epoxy group, thereby obtaining excellent production stability advantageously. A liquid crystal aligning agent which contains a reaction product of a reactive polyorganosiloxane synthesized by using an alkali metal compound or an organic base as the catalyst and a reactive compound is very convenient because it has extremely high storage stability. The reason for this is assumed to be that, when an alkali metal compound or an organic base is used as the catalyst in the hydrolysis/condensation reaction, a random structure, ladder-like structure or cage structure is formed, thereby obtaining a polyorganosiloxane having a low content of a silanol group, as described in Chemical Reviews, vol. 95, p. 1409 (1995). That is, since the polyorganosiloxane has a low content of the silanol group, a condensation reaction between silanol groups is suppressed and further, when the liquid crystal aligning agent of the present invention contains another polymer which will be described hereinafter, a condensation reaction between the silanol group and the another polymer is suppressed with the result that excellent storage stability is obtained.

The catalyst is particularly preferably an organic base. The amount of the organic base differs according to the type of the organic base and reaction conditions such as temperature and should be suitably set. For example, it is preferably 0.01 to 3 times, more preferably 0.05 to 1 time the total molar amount of all the silane compounds.

The hydrolysis or hydrolysis/condensation reaction for producing the reactive polyorganosiloxane is preferably carried out by dissolving the silane compound having an epoxy group and optionally another silane compound in an organic solvent, mixing this resulting solution with an organic base and water, and heating the resulting mixture in an oil bath, for example.

At the time of the hydrolysis/condensation reaction, heating is desirably carried out at preferably 130° C. or lower, more preferably 40 to 100° C. for preferably 0.5 to 12 hours, more preferably 1 to 8 hours. During heating, the mixture solution may be stirred or refluxed.

After the end of the reaction, an organic solvent layer separated from the reaction solution is preferably washed with water. The reaction solution is preferably washed with water containing a small amount of a salt, for example, an aqueous solution containing about 0.2 wt % of ammonium nitrate because the washing operation becomes easy. Washing is carried out until the water layer after washing becomes neutral, and then the organic solvent layer is optionally dried with a suitable drying agent such as anhydrous calcium sulfate or molecular sieves to remove the solvent, thereby making it possible to obtain the reactive polyorganosiloxane of interest.

Commercially available products of the reactive polyorganosiloxane may be used in the present invention. The commercially available products having an epoxy group include DMS-E01, DMS-E12, DMS-E21 and EMS-32 (of Chisso Corporation).

<Reactive Compound>

The reactive compound used in the present invention contains at least the compound (1). Only the compound (1) or a mixture of the compound (1) and another compound may be used as the reactive compound. The another compound which can be used herein is, for example, a compound represented by the following formula (2) (to be referred to as "compound (2)" hereinafter) or a compound represented by the following formula (3) (to be referred to as "compound (3)" hereinafter).

$A^2-L^2-Z$ (2)

$A^3-L^3-Z$ (3)

(in the above formula (2), $A^2$ is an ethenyl group, 1-methylethenyl group or ethynyl group, and $L^2$ is a single bond, methylene group, alkylene group having 2 to 20 carbon atoms, *—COO—$(CH_2)_n$— (n is an integer of 1 to 20, the bond marked with "*" is bonded to $A^2$) or phenylene group, and in the above formula (3), $A^3$ is a hydroxyl group, mercapto group, cyano group, nitro group, perfluoroalkyl group having 1 to 20 carbon atoms, perfluoroalkoxyl group having 1 to 20 carbon atoms or fluorinated phenyl group, with the proviso that when $A^3$ is a hydroxyl group, mercapto group, cyano group or nitro group, $L^3$ is a methylene group, alkylene group having 2 to 20 carbon atoms, phenylene group or group represented by the following formula ($L^3$-1) or ($L^3$-2):

($L^3$-1)

($L^3$-2)

(in the above formulas ($L^3$-1) and ($L^3$-2), n is an integer of 1 to 20, and the bond marked with "*" is bonded to $A^3$), when $A^3$ is a perfluoroalkyl group having 1 to 20 carbon atoms, $L^3$ is a single bond or phenylene group which may be substituted by a perfluoroalkyl group having 1 to 20 carbon atoms, when $A^3$ is a perfluoroalkoxyl group having 1 to 20 carbon atoms, $L^3$ is a phenylene group, and when $A^3$ is a fluorinated phenyl group, $L^3$ is a single bond and the fluorinated phenyl group as $A^3$ may be substituted by an alkyl group having 1 to 10 carbon atoms, and Z in the above formulas (2) and (3) is as defined in the above formula (1).)

[Compound (1)]

The compound (1) used in the present invention is a compound represented by the above formula (1).

Examples of the alkyl group having 1 to 20 carbon atoms represented by $A^1$ in the above formula (1) include methyl group, ethyl group, n-propyl group, i-propyl group, n-butyl group, sec-butyl group, tert-butyl group, n-pentyl group, 3-methylbutyl group, 2-methylbutyl group, 1-methylbutyl group, 2,2-dimethylpropyl group, n-hexyl group, 4-methylpentyl group, 3-methylpentyl group, 2-methylpentyl group, 1-methylpentyl group, 3,3-dimethylbutyl group, 2,3-dimethylbutyl group, 1,3-dimethylbutyl group, 2,2-dimethylbutyl group, 1,2-dimethylbutyl group, 1,1-dimethylbutyl group, n-heptyl group, 5-methylhexyl group, 4-methylhexyl group, 3-methylhexyl group, 2-methylhexyl group, 1-methylhexyl group, 4,4-dimethylpentyl group, 3,4-dimethylpentyl group, 2,4-dimethylpentyl group, 1,4-dimethylpentyl group, 3,3-dimethylpentyl group, 2,3-dimethylpentyl group, 1,3-dimethylpentyl group, 2,2-dimethylpentyl group, 1,2-dimethylpentyl group, 1,1-dimethylpentyl group, 2,3,3-trimethylbutyl group, 1,3,3-trimethylbutyl group, 1,2,3-trimethylbutyl group, n-octyl group, 6-methylheptyl group, 5-methylheptyl group, 4-methylheptyl group, 3-methylheptyl group, 2-methylheptyl group, 1-methylheptyl group, 2-ethylhexyl group, n-nonanyl group, cyclononanyl group, n-decyl group, n-undecyl group, n-dodecyl group and n-heptadecyl group; examples of the cycloalkyl group having 5 to 10 carbon atoms which may be substituted by an alkyl group or alkoxyl group having 1 to 20 carbon atoms include cyclopentyl group, cyclohexyl group, cycloheptyl group, cyclooctyl group, cyclononanyl group, cyclodecyl group and cyclododecyl group; and examples of the hydrocarbon group having 17 to 51 carbon atoms and a steroid skeleton include groups represented by the following formulas ($A^1$-1) to ($A^1$-3).

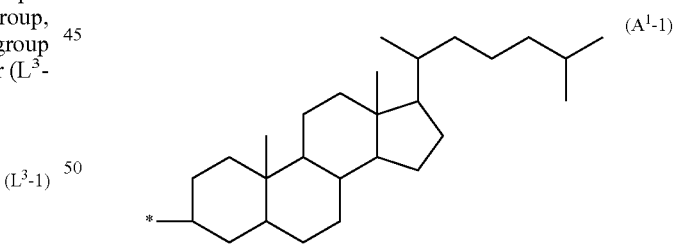
($A^1$-1)

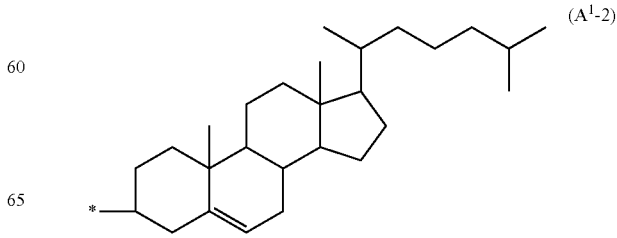
($A^1$-2)

-continued

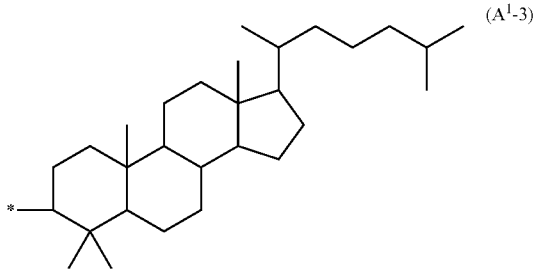

(A¹-3)

Out of these, preferred $A^1$ differs according to the type of $L^1$. When $L^1$ is a single bond, preferred examples of $A^1$ include i-propyl group, n-butyl group, sec-butyl group, tert-butyl group, n-pentyl group, cyclopentyl group, 2,2-dimethylpropyl group, n-hexyl group, cyclohexyl group, 3,3-dimethylbutyl group, 2,2-dimethylbutyl group, n-heptyl group, 4,4-dimethylpentyl group, n-octyl group, 2-ethylhexyl group, n-nonanyl group, n-decyl group, n-undecyl group, n-dodecyl group, n-heptadecyl group and groups represented by the above formulas ($A^1$-1), ($A^1$-2) and ($A^1$-3). Out of these, n-hexyl group, cyclohexyl group, n-octyl group, 2-ethylhexyl group, n-undecyl group, n-dodecyl group, n-heptadecyl group and groups represented by the above formulas ($A^1$-1) and ($A^1$-3) are particularly preferred. When $L^1$ is a phenylene group, biphenylene group, cyclohexylene group, cyclohexylene group or group represented by the above formula ($L^1$-1) or ($L^1$-2), $A^1$ is preferably a methyl group, i-propyl group, n-butyl group, sec-butyl group, tert-butyl group, n-pentyl group, cyclopentyl group, 2,2-dimethylpropyl group, n-hexyl group, cyclohexyl group, 3,3-dimethylbutyl group, 2,2-dimethylbutyl group, n-heptyl group, 4,4-dimethylpentyl group, n-octyl group, 2-ethylhexyl group, n-nonanyl group, n-decyl group, n-undecyl group, n-dodecyl group, n-heptadecyl group or group represented by ($A^1$-1, ($A^1$-2) or ($A^1$-3). Out of these, methyl group, i-propyl group, n-butyl group, n-hexyl group, cyclohexyl group, n-octyl group, 2-ethylhexyl group, n-undecyl group, n-dodecyl group, n-heptadecyl group and groups represented by the above formula ($A^1$-1) and ($A^1$-3) are particularly preferred.

In the present invention, a liquid crystal aligning agent which is preferred for liquid crystal display devices can be obtained by suitably selecting the type of $A^1$ in the above formula (1). For example, when $A^1$ is an alkyl group having 1 to 8 carbon atoms or cycloalkyl group having 5 to 8 carbon atoms, a liquid crystal aligning agent preferred for TN or STN liquid crystal display devices can be obtained. When $A^1$ is an alkyl group having 6 to 20 carbon atoms, cycloalkyl group having 6 to 10 carbon atoms, or hydrocarbon group having 17 to 51 carbon atoms and a steroid skeleton, a liquid crystal aligning agent preferred for VA liquid crystal display devices can be obtained.

The phenylene group, biphenylene group, cyclohexylene group and bicyclohexylene group represented by $L^1$ in the above formula (1) are preferably a 1,4-phenylene group, 4,4'-biphenylene group, 1,4-cyclohexylene group, and 4,4'-bicyclohexylene group, respectively.

Z in the above formula (1) is preferably a carboxyl group.
[Compound (2)]

The compound (2) which may be optionally used in the present invention is a compound represented by the above formula (2). A liquid crystal aligning agent which contains a liquid crystal aligning polyorganosiloxane obtained from a mixture of the compound (1) and the compound (2) as the reactive compound is preferred because it can provide a liquid crystal alignment film having excellent light resistance.

The phenylene group represented by $L^2$ in the above formula (2) is preferably a 1,4-phenylene group.

As for a preferred combination of $A^2$ and $L^2$ in the above formula (2), preferred examples of the group represented by $A^2$-$L^2$ include ethenyl group, acryloxymethyl group, acryloxyethyl group, acryloxypropyl group, acryloxybutyl group, acryloxypentyl group, acryloxyhexyl group, acryloxyheptyl group, acryloxyoctyl group, acryloxynonyl group, acryloxydecyl group, acryloxyundecyl group, acryloxydodecyl group, acryloxyoctadecyl group, 1-methylethenyl group, methacryloxymethyl group, methacryloxyethyl group, methacryloxypropyl group, methacryloxybutyl group, methacryloxypentyl group, methacryloxyhexyl group, methacryloxyheptyl group, methaocryloxyoctyl group, methacryloxynonyl group, methacryloxydecyl group, methacryloxyundecyl group, methacryloxydodecyl group, methacryloxyoctadecyl group, ethynyl group, 2-propynyl group, 3-butynyl group, 4-pentynyl group, 5-hexynyl group, 6-heptynyl group, 7-octynyl group, 11-dodecynyl group, 17-octadecynyl group, styryl group and 4-ethynylphenyl group. Out of these, ethenyl group, acryloxypropyl group, acryloxyhexyl group, 1-methylethenyl group, methacryloxypropyl group, methacryloxyhexyl group, ethynyl group, 2-propynyl group, 3-butynyl group, styryl group and 4-ethylnylphenyl group are preferred, and ethenyl group, acryloxypropyl group, 1-methylethenyl group, methacryloxypropyl group, styryl group and 4-ethynylphenyl group are particularly preferred.

Z in the above formula (2) is preferably the same group as Z in the above formula (1).
[Compound (3)]

The compound (3) which may be optionally used in the present invention is a compound represented by the above formula (3). A liquid crystal aligning agent containing a liquid crystal aligning polyorganosiloxane which is obtained from a mixture of the compound (1) and the compound (3) as the reactive compound is preferred because it can provide a liquid crystal alignment film having excellent after-image property.

The phenylene group represented by $L^3$ in the above formula (3) is preferably a 1,4-phenylene group. "n" in the above formulas ($L^3$-1) and ($L^3$-2) is an integer of preferably 1 to 6, particularly preferably 1.

As for a preferred combination of $A^3$ and $L^3$ in the above formula (3), preferred examples of the group represented by $A^3$-$L^3$- include hydroxymethyl group, 2-hydroxyethyl group, 3-hydroxypropyl group, 2-hydroxypropyl group, 4-hydroxybutyl group, 3-hydroxybutyl group, 2-hydroxybutyl group, 5-hydroxypentyl group, 4-hydroxypentyl group, 3-hydroxypentyl group, 6-hydroxyhexyl group, 5-hydroxyhexyl group, 4-hydroxyhexyl group, 7-hydroxyheptyl group, 8-hydroxyoctyl group, 10-hydroxydecyl group, 11-hydroxyundecyl group, 12-hydroxydodecyl group, 18-hydroxyoctadecyl group, 4-hydroxyphenyl group, 4-(hydroxymethyl)phenyl group, 4-hydroxybenzyl group, mercaptomethyl group, 2-mercaptoethyl group, 3-mercaptopropyl group, 4-mercaptobutyl group, 5-mercaptopentyl group, 6-mercaptohexyl group, 8-mercaptooctyl group, 10-mercaptodecyl group, 11-mercaptoundecyl group, 12-mercaptododecyl group, 18-mercaptooctadecyl group, 4-mercaptophenyl group, 4-mercaptobenzyl group, trifluoromethyl group, perfluoroethyl group, perfluoropropyl group, perfluorobutyl group, perfluoropentyl group, perfluorohexyl group, perfluoroheptyl group, perfluorooctyl group, perfluorodecyl group, perfluorododecyl group, perfluorooctadecyl group, 4-fluorophenyl group, 2,4-difluorophenyl group, 3,4-difluorophenyl group, 3,4,5-trifluorophenyl group, pentafluorophenyl group, 4-trifluoromethylphenyl group, 3,5-bistrifluoromethylphenyl group, 4-trifluoromethoxyphenyl group, 3-fluoro-4-octyloxyphenyl group, cyano group, cyanomethyl group, 2-cyanoethyl group, 3-cyanopropyl group, 4-cyanobutyl group, 5-cyanopentyl group, 6-cyanohexyl group, 7-cyanoheptyl group, 8-cyanooctyl group, 10-cyanodecyl group, 11-cyanoundecyl group, 12-cyanododecyl group, 18-cyanooctadecyl group, 4-cyanophenyl group, 4-cyanobenzyl group, nitro group, nitromethyl group, 2-nitroethyl group, 3-nitropropyl group, 4-nitrobutyl group, 35-nitropentyl group, 6-nitrohexyl group, 7-nitroheptyl group, 8-nitrooctyl group, 10-nitrodecyl group, 11-nitroundecyl group, 12-nitrododecyl group, 18-nitrooctadecyl group, 4-nitrophenyl group, 3,5-dinitrophenyl group, 2,4-dinitrophenyl group and 4-nitrobenzyl group. Out of these, preferred are hydroxymethyl group, 2-hydroxyethyl group, 3-hydroxypropyl group, 4-hydroxybutyl group, 5-hydroxypentyl group, 6-hydroxyhexyl group, 7-hydroxyheptyl group, 8-hydroxyoctyl group, 10-hydroxydecyl group, 11-hydroxyundecyl group, 12-hydroxydodecyl group, 18-hydroxyoctadecyl group, 4-hydroxyphenyl group, 4-hydroxybenzyl group, mercaptomethyl group, 2-mercaptoethyl group, 3-mercaptopropyl group, 4-mercaptobutyl group, 5-mercaptopentyl group, 6-mercaptohexyl group, 8-mercaptooctyl group, 10-mercaptodecyl group, 11-mercaptoundecyl group, 12-mercaptododecyl group, 18-mercaptooctadecyl group, 4-mercaptophenyl group, 4-mercaptobenzyl group, trifluoromethyl group, 4-fluorophenyl group, 2,4-difluorophenyl group, 3,4-difluorophenyl group, 3,4,5-trifluorophenyl group, 4-trifluoromethylphenyl group, 4-trifluoromethoxyphenyl group, 3-fluoro-4-octyloxyphenyl group, cyano group, cyanomethyl group, 2-cyanoethyl group, 3-cyanopropyl group, 4-cyanobutyl group, 5-cyanopentyl group, 6-cyanohexyl group, 7-cyanoheptyl group, 8-cyanooctyl group, 10-cyanodecyl group, 11-cyanoundecyl group, 12-cyanododecyl group, 18-cyanooctadecyl group, 4-cyanophenyl group, 4-cyanobenzyl group, nitro group, nitromethyl group, 2-nitroethyl group, 3-nitropropyl group, 4-nitrobutyl group, 3,5-nitropentyl group, 6-nitrohexyl group, 7-nitroheptyl group, 8-nitrooctyl group, 10-nitrodecyl group, 11-nitroundecyl group, 12-nitrododecyl group, 18-nitrooctadecyl group, 4-nitrophenyl group, 3,5-dinitrophenyl group, 2,4-dinitrophenyl group and 4-nitrobenzyl group.

Particularly preferred are 4-hydroxyphenyl group, 4-hydroxybenzyl group, 4-mercaptophenyl group, 4-mercaptobenzyl group, trifluoromethyl group, 4-fluorophenyl group, 2,4-difluorophenyl group, 3,4-difluorophenyl group, 3,4,5-trifluorophenyl group, 4-trifluoromethylphenyl group, 4-trifluoromethoxyphenyl group, 3-fluoro-4-octyloxyphenyl group, cyano group, 4-cyanophenyl group, 4-cyanobenzyl group, nitro group, 4-nitrophenyl group, 3,5-dinitrophenyl group, 2,4-dinitrophenyl group and 4-nitrobenzyl group.

Z in the above formula (3) is preferably the same group as Z in the above formula (1).

<Liquid Crystal Aligning Polyorganosiloxane>

The liquid crystal aligning polyorganosiloxane used in the present invention can be synthesized by reacting the above reactive polyorganosiloxane with the above reactive compound preferably in the presence of a catalyst. A preferred combination of the reactive polyorganosiloxane and the reactive compound is a combination of a reactive polyorganosiloxane of the above formula (S-1) in which $X^1$ is a group having an epoxy group and a reactive compound of any one of the above formulas (1) to (3) in which Z is a carboxyl group.

The amount of the reactive compound is preferably 0.001 to 1.5 moles, more preferably 0.01 to 1 mole, much more preferably 0.05 to 0.9 mole based on 1 mole of the group $X^1$ of the reactive polyorganosiloxane.

When only the compound (1) is used as the reactive compound, the compound (1) is preferably used in the above amount.

When a mixture of the compound (1) and the compound (2) is used as the reactive compound, the total amount of the compound (1) and the compound (2) should fall within the above range, and the amount of the compound (2) is preferably not more than 75 mol % based on the total of the compound (1) and the compound (2). This value is more preferably 3 to 70 mol %, much more preferably 15 to 50 mol %, particularly preferably 20 to 45 mol %.

When a mixture of the compound (1) and the compound (3) is used as the reactive compound, the total amount of the compound (1) and the compound (3) should fall within the above range, and the amount of the compound (3) is preferably not more than 75 mol % based on the total of the compound (1) and the compound (3). This value is more preferably 3 to 70 mol %, much more preferably 15 to 50 mol %, particularly preferably 20 to 45 mol %.

As the above catalyst, not only an organic base but also a compound known as so-called "curing accelerator" which promotes the reaction of an epoxy compound when $X^1$ in the above formula (S-1) is a group having an epoxy group may be used.

Examples of the above organic base include primary and secondary organic amines such as ethylamine, diethylamine, piperazine, piperidine, pyrrolidine and pyrrole; tertiary organic amines such as triethylamine, tri-n-propylamine, tri-n-butylamine, pyridine, 4-dimethylaminopyridine and diazabicycloundecene; and quaternary organic amines such as tetramethylammonium hydroxide. Out of these organic bases, tertiary organic amines such as triethylamine, tri-n-propylamine, tri-n-butylamine, pyridine and 4-dimethylaminopyridine; and quaternary organic amines such as tetramethylammonium hydroxide are preferred.

Examples of the above curing accelerator include tertiary amines such as benzyldimethylamine, 2,4,6-tris(dimethylaminomethyl)phenol, cyclohexyldimethylamine and triethanolamine; imidazole compounds such as 2-methylimidazole, 2-n-heptylimidazole, 2-n-undecylimidazole, 2-phenylimidazole, 2-phenyl-4-methylimidazole, 1-benzyl-2-methylimidazole, 1-benzyl-2-phenylimidazole, 1,2-dimethylimidazole, 2-ethyl-4-methylimidazole, 1-(2-cyanoethyl)-2-methylimidazole, 1-(2-cyanoethyl)-2-n-undecylimidazole, 1-(2-cyanoethyl)-2-phenylimidazole, 1-(2-cyanoethyl)-2-ethyl-4-methylimidazole, 2-phenyl-4-methyl-5-hydroxymethylimidazole, 2-phenyl-4,5-di(hydroxymethyl)imidazole, 1-(2-cyanoethyl)-2-phenyl-4,5-di[(2'-cyanoethoxy)methyl]imidazole, 1-(2-cyanoethyl)-2-n-undecylimidazolium trimellitate, 1-(2-cyanoethyl)-2-phenylimidazolium trimellitate, 1-(2-cyanoethyl)-2-ethyl-4-methylimidazolium trimellitate, 2,4-diamino-6-[2'-methylimidazolyl-(1')]ethyl-s-triazine, 2,4-diamino-6-(2'-n-undecylimidazolyl)ethyl-s-triazine, 2,4-diamino-6-[2'-ethyl-4'-methylimidazolyl-(1')]ethyl-s-triazine, isocyanuric acid adduct of 2-methylimidazole, isocyanuric acid adduct of 2-phenylimidazole and isocyanuric acid adduct of 2,4-diamino-6-[2'-methylimidazolyl-(1')]ethyl-s-triazine; organic phosphorus compounds such as diphenyl phosphine, triphenyl phosphine and triphenyl phosphite; quaternary phosphonium salts such as benzyltriphenylphosphonium chloride, tetra-n-butylphosphonium bromide, methyltriphenylphosphonium bromide, ethyltriphenylphosphonium bromide, n-butyltriphenylphosphonium bromide, tetraphenylphosphonium bromide, ethyltriphenylphosphonium iodide, ethyltriphenylphosphonium acetate, tetra-n-butylphosphonium-o, o-diethylphosphorodithionate, tetra-n-butylphosphonium benzotriazolate tetra-n-butylphosphonium tetrafluoroborate, tetra-n-butylphosphonium tetraphenylborate and tetraphenylphosphonium tetraphenylborate; diazabicycloalkenes such as 1,8-diazabicyclo[5.4.0]undecene-7 and organic acid salts thereof; organic metal compounds such as zinc octylate, tin octylate and aluminum acetylacetone complex; quaternary ammonium salts such as tetraethylammonium bromide, tetra-n-butylammonium bromide, tetraethylammonium chloride and tetra-n-butylammonium chloride; boron compounds such as boron trifluoride and triphenyl borate; metal halogen compounds such as zinc chloride and stannic chloride; high-melting point dispersible latent curing accelerators such as amine addition type accelerators including an adduct of dicyandiamide or amine with epoxy resin; microcapsule type latent curing accelerators obtained by coating the surfaces of curing accelerators such as the above imidazole compounds, organic phosphorus compounds and quaternary phosphonium salts with a polymer; amine salt type latent curing accelerators; and latent curing accelerators such as high-temperature dissociation type thermally cationic polymerization latent curing accelerators such as Lewis acid salts and Brøsted acid salts.

Out of these, quaternary ammonium salts such as tetraethylammonium bromide, tetra-n-butylammonium bromide, tetraethylammonium chloride and tetra-n-butylammonium chloride are preferred.

The catalyst is used in an amount of preferably not more than 100 parts by weight, more preferably 0.01 to 100 parts by weight, much more preferably 0.1 to 20 parts by weight based on 100 parts by weight of the reactive polyorganosiloxane.

The reaction temperature is preferably 0 to 200° C., more preferably 50 to 150° C. The reaction time is preferably 0.1 to 50 hours, more preferably 0.5 to 20 hours.

The synthesis reaction of the liquid crystal aligning polyorganosiloxane may be carried out in the presence of an organic solvent as required. The organic solvent is selected from a hydrocarbon compound, ether compound, ester compound, ketone compound, amide compound and alcohol compound. Out of these, an ether compound, ester compound and ketone compound are preferred from the viewpoints of the solubilities of the raw materials and the product and the purification ease of the obtained product. Particularly preferred examples of the solvent include 2-butanone, 2-hexanon, methyl isobutyl ketone and butyl acetate. The solvent is used in an amount which ensures that the solids content (the ratio of the total weight of components except for the solvent in the reaction solution to the total weight of the solution) becomes preferably not less than 0.1 wt %, more preferably 5 to 50 wt %.

<Other Components>

The liquid crystal aligning agent of the present invention contains the above-described liquid crystal aligning polyorganosiloxane as an essential component.

The liquid crystal aligning agent of the present invention may further contain other components in addition to the above liquid crystal aligning polyorganosiloxane as long as the effect of the present invention is not impaired. The other components include a polymer except for the liquid crystal aligning polyorganosiloxane (to be referred to as "another polymer" hereinafter), a heat-sensitive crosslinking agent, a functional silane compound and a surfactant.

<Another Polymer>

The above another polymer may be used to further improve the solution properties of the liquid crystal aligning agent of the present invention and the electric properties of the obtained liquid crystal alignment film. Examples of the another polymer include at least one selected from the group consisting of a polyamic acid and a polyimide, at least one (to be referred to as "another polyorganosiloxane" hereinafter) selected from the group consisting of a polysiloxane having a recurring unit represented by the following formula (S-2), a hydrolysate thereof and a condensate of the hydrolysate, a polyamic acid ester, a polyester, a polyamide, a cellulose derivative, a polyacetal, a polystyrene derivative, a poly(styrene-phenylmaleimide) derivative and a poly(meth)acrylate.

(S-2)

(In the above formula (S-2), $X^2$ is a hydroxyl group, halogen atom, alkyl group having 1 to 20 carbon atoms, alkoxyl group having 1 to 6 carbon atoms or aryl group having 6 to 20 carbon atoms, and $Y^2$ is a hydroxyl group or alkoxyl group having 1 to 10 carbon atoms.)

[Polyamic Acid]

The above polyamic acid can be obtained by reacting a tetracarboxylic dianhydride with a diamine.

Examples of the tetracarboxylic dianhydride which can be used to synthesize the polyamic acid include aliphatic and alicyclic tetracarboxylic dianhydrides such as butanetetracarboxylic dianhydride, 1,2,3,4-cyclobutanetetracarboxylic dianhydride, 1,2-dimethyl-1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-tetramethyl-1,2,3,4-cyclobutanetetracarboxylic dianhydride, 1,2,3,4-cyclopentanetetracarboxylic dianhydride, 1,2,4,5-cyclohexanetetracarboxylic dianhydride, 3,3',4,4'-dicyclohexyltetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3-dione, 1,3,3a,4,5,9b-hexahydro-7-ethyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, 5-(2,5-dioxotetrahydrofuranyl)-3-methyl-3-cyclohexene-1,2-dicarboxylic anhydride, bicyclo[2.2.2]-oct-7-ene-2,3,5,6-tetracarboxylic dianhydride, 3-oxabicyclo[3.2.1]octane-2,4-dione-6-spiro-3'-(tetrahydrofuran-2',5'-dione), 5-(2,5-dioxotetrahydro-3-furanyl)-3-methyl-3-cyclohexene-1,2-dicarboxylic anhydride, 3,5,6-tricarboxy-2-carboxynorbornane-2:3,5:6-dianhydride, 4,9-dioxatricyclo[5.3.1.0$^{2,6}$]undecane-3,5,8,10-tetraone and compounds represented by the following formulas (T-I) and (T-II):

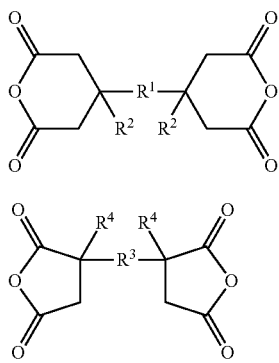

(T-I)

(T-II)

(in the above formulas (T-I) and (T-II), $R^1$ and $R^3$ are each a divalent organic group having an aromatic ring, and $R^2$ and $R^4$ are each a hydrogen atom or alkyl group, with the proviso that $R^2$'s and $R^4$'s may be the same or different); and aromatic tetracarboxylic dianhydrides such as pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, 2,2',3,3'-biphenyltetracarboxylic dianhydride, bis(phthalic acid)phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenyl ether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate) and compounds represented by the following formulas (T-1) to (T-4).

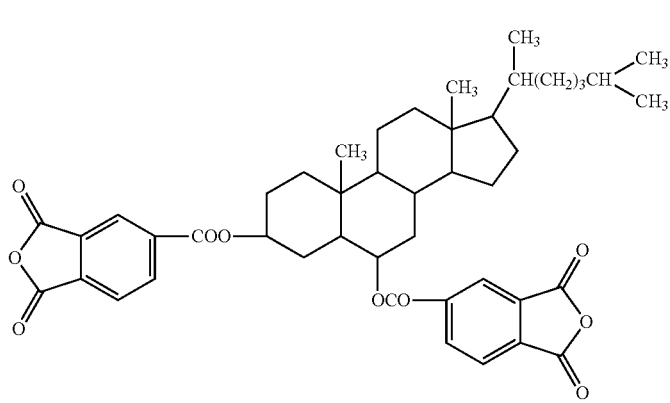

(T-1)

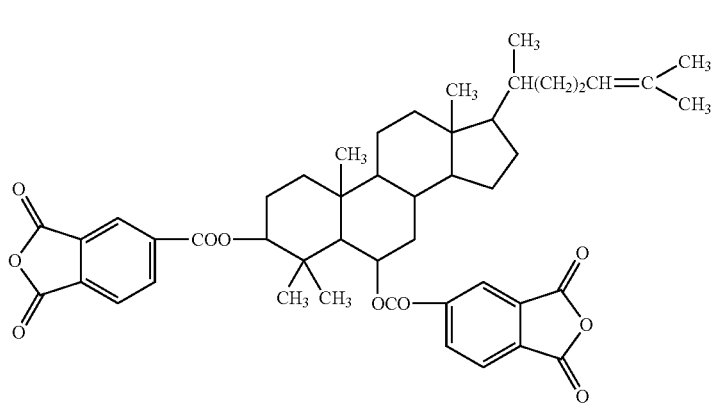

(T-2)

(T-3)

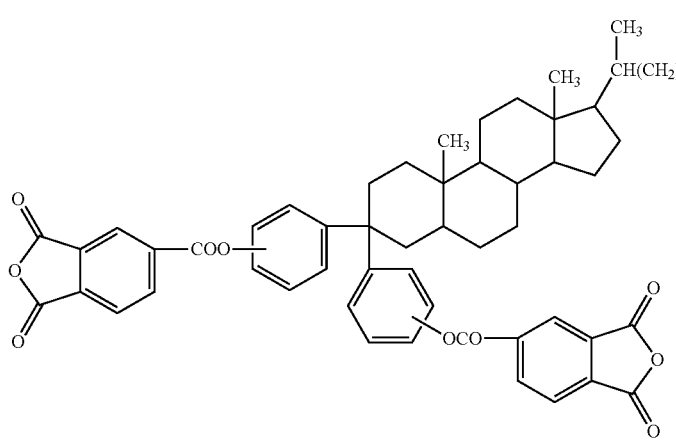

(T-4)

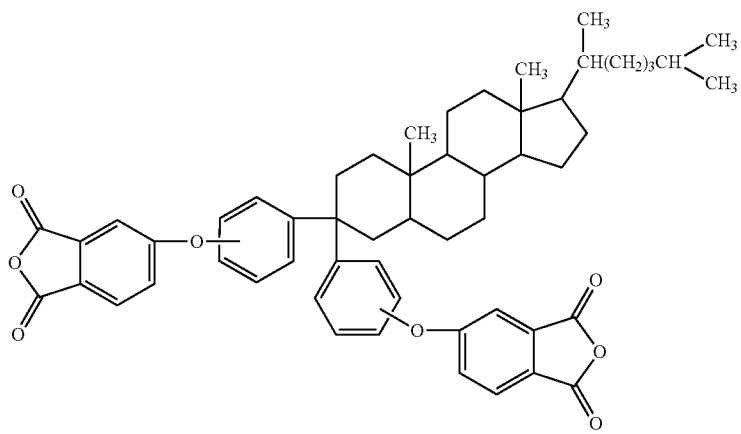

They may be used alone or in combination of two or more.

Examples of the compound represented by the above formula (T-I) include compounds represented by the following formulas (T-5) to (T-7), and examples of the compound represented by the above formula (T-II) include a compound represented by the following formula (T-8).

(T-5)
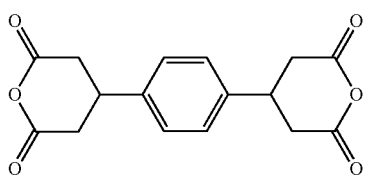

(T-6)
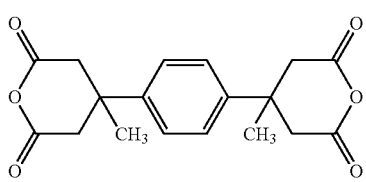

(T-7)
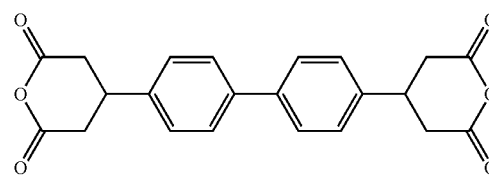

(T-8)
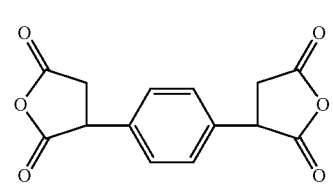

The tetracarboxylic dianhydride which is used to synthesize the polyamic acid optionally contained in the liquid crystal aligning agent of the present invention is preferably a tetracarboxylic dianhydride which includes 2,3,5-tricarboxycyclopentylacetic dianhydride.

Examples of the diamine used to synthesize the above polyamic acid include aromatic diamines such as p-phenylenediamine, m-phenylenediamine, 4,4'-diaminodiphenylmethane, 4,4'-diaminodiphenylethane, 4,4'-diaminodiphenylsulfide, 4,4'-diaminodiphenylsulfone, 3,3'-dimethyl-4,4'-diaminobiphenyl, 4,4'-diaminobenzanilide, 4,4'-diaminodiphenyl ether, 1,5-diaminonaphthalene, 2,2'-dimethyl-4,4'-diaminobiphenyl, 3,3'-dimethyl-4,4'- diaminobiphenyl, 2,2'-ditrifluoromethyl-4,4'-diaminobiphenyl, 3,3'-ditrifluoromethyl-4,4'-diaminobiphenyl, 5-amino-1-(4'-aminophenyl)-1,3,3-trimethylindane, 6-amino-1-(4'-aminophenyl)-1,3,3-trimethylindane, 3,4'-diaminodiphenyl ether, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl] diaminobiphenyl, 1,4,4'-(p-phenyleneisopropylidene)bisaniline, 4,4'-(m-phenyleneisopropylidene)bisaniline, 2,2-bis[4-(4-amino-2-trifluoromethylphenoxy)phenyl] hexafluoropropane, 4,4'-diamino-2,2'-bis(trifluoromethyl) biphenyl, 4,4'-bis[(4-amino-2-trifluoromethyl)phenoxy]-octafluorobiphenyl and compounds represented by the following formulas (D-1) to (D-5):

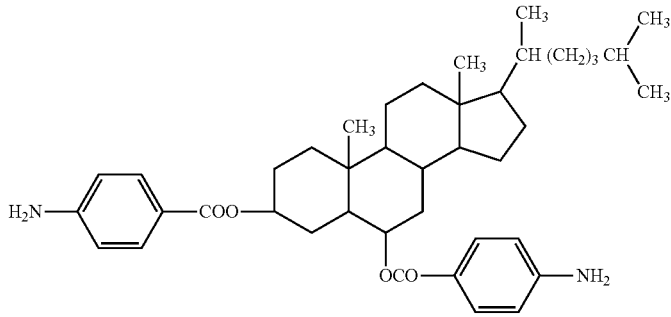

(D-1)

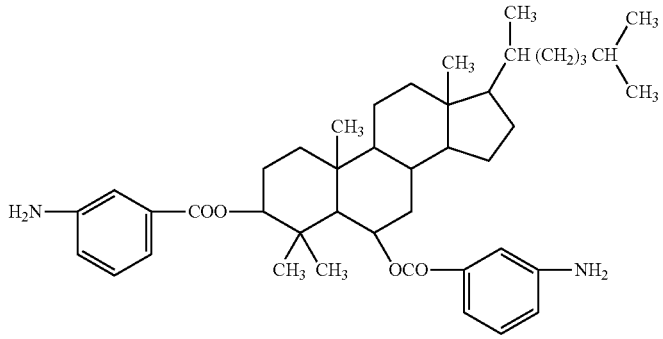

(D-2)

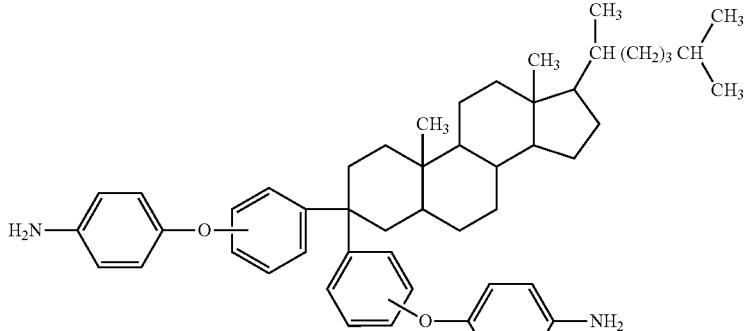

(D-3)

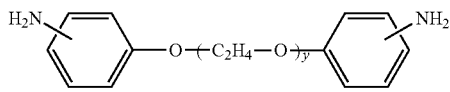

(D-4)

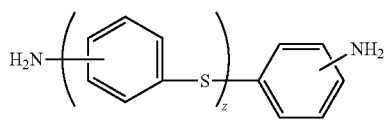

(D-5)

hexafluoropropane, 2,2-bis(4-aminophenyl) hexafluoropropane, 2,2-bis[4-(4-aminophenoxy)phenyl] sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-dimethyl-2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-

(y in the above formula (D-4) is an integer of 2 to 12, and z in the formula (D-5) is an integer of 1 to 5);

aliphatic and alicyclic diamines such as 1,1-metaxylylenediamine, 1,3-propanediamine, tetramethylenediamine, pentamethylenediamine, hexamethylenediamine, heptamethylenediamine, octamethylenediamine, nonamethylenediamine, 1,4-diaminocyclohexane, isophoronediamine, tetrahydrodicyclopentadienylenediamine, hexahydro-4,7-methanoindanylenedimethylenediamine, tricyclo[6.2.1.0²,⁷]-undecylenedimethyldiamine, 4,4'-methylenebis(cyclohexylamine), 1,3-bis(aminomethyl)cyclohexane and 1,4-bis(aminomethyl)cyclohexane;

diamines having two primary amino groups and a nitrogen atom except for the primary amino group in the molecule such as 2,3-diaminopyridine, 2,6-diaminopyridine, 3,4-diaminopyridine, 2,4-diaminopyrimidine, 5,6-diamino-2,3-dicyanopyrazine, 5,6-diamino-2,4-dihydroxypyrimidine, 2,4-diamino-6-dimethylamino-1,3,5-triazine, 1,4-bis(3-aminopropyl)piperazine, 2,4-diamino-6-isopropoxy-1,3,5-triazine, 2,4-diamino-6-methoxy-1,3,5-triazine, 2,4-diamino-6-phenyl-1,3,5-triazine, 2,4-diamino-6-methyl-s-triazine, 2,4-diamino-1,3,5-triazine, 4,6-diamino-2-vinyl-s-triazine, 2,4-diamino-5-phenylthiazole, 2,6-diaminopurine, 5,6-diamino-1,3-dimethyluracil, 6,9-diamino-2-ethoxyacridinelactate, 3,8-diamino-6-phenylphenanthridine, 1,4-diaminopiperazine, 3,6-diaminoacridine, bis(4-aminophenyl)phenylamine, 3,6-diaminocarbazole, N-methyl-3,6-diaminocarbazole, N-ethyl-3,6-diaminocarbazole, N-phenyl-3,6-diaminocarbazole, N,N'-di(4-aminophenyl)-benzidine, compounds represented by the following formula (D-I):

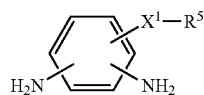

(D-I)

(in the above formula (D-I), R⁵ is a monovalent organic group having a ring structure including a nitrogen atom selected from the group consisting of pyridine, pyrimidine, triazine, piperidine and piperazine, and X¹ is a divalent organic group), and compounds represented by the following formula (D-II):

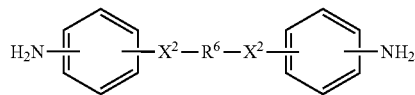

(D-II)

(in the above formula (D-II), R⁶ is a divalent organic group having a ring structure including a nitrogen atom selected from the group consisting of pyridine, pyrimidine, triazine, piperidine and piperazine, and X²'s are each a divalent organic group and may be the same or different); monosubstituted phenylenediamines such as compounds represented by the following formula (D-III):

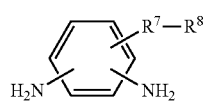

(D-III)

(in the above formula (D-III), R⁷ is a divalent organic group selected from the group consisting of —O—*, —COO—*, —OCO—*, —NHCO—*, —CONH—* and —CO—* (the bond marked with "*" is bonded to R⁸), and R⁸ is an alkyl group having 6 to 30 carbon atoms or monovalent organic group having a steroid skeleton, trifluoromethylphenyl group, trifluoromethoxyphenyl group or fluorinated phenyl group); and diaminoorganosiloxanes such as compounds represented by the following formula (D-IV):

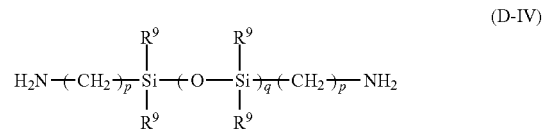

(D-IV)

(in the above formula (D-IV), R⁹'s are each a hydrocarbon group having 1 to 12 carbon atoms and may be the same or different, p's are each an integer of 1 to 3, and q is an integer of 1 to 20). The benzene rings of the above aromatic diamines, the above diamines having two primary amino groups and a nitrogen atom except for the primary amino group in the molecule and the above monosubstituted phenylenediamines may be substituted by an alkyl group having 1 to 4 carbon atoms (preferably methyl group). These diamines may be used alone or in combination of two or more.

As the diamine which is used to synthesize the above polyamic acid optionally contained in the liquid crystal aligning agent of the present invention, preferred is a diamine including at least one (to be referred to as "specific diamine" hereinafter) selected from the group consisting of p-phenylenediamine, 4,4'-diaminodiphenylmethane, 4,4'-diaminodiphenylsulfide, 1,5-diaminonaphthalene, 2,2'-dimethyl-4,4'-diaminobiphenyl, 2,2'-ditrifluoromethyl-4,4'-diaminobiphenyl, 2,7-diaminofluorene, 4,4'-diaminodiphenyl ether, 2,2-bis[4-(4-aminophenoxy)phenyl]propane, 9,9-bis(4-aminophenyl)fluorene, 2,2-bis[4-(4-aminophenoxy)phenyl]hexafluoropropane, 2,2-bis(4-aminophenyl)hexafluoropropane, 4,4'-(p-phenylenediisopropylidene)bisaniline, 4,4'-(m-phenylenediisopropylidene)bisaniline, 1,4-bis(4-aminophenoxy)benzene, 4,4'-bis(4-aminophenoxy)biphenyl, 1,4-cyclohexanediamine, 4,4'-methylenebis(cyclohexylamine), 1,3-bis(aminomethyl)cyclohexane, compounds represented by the above formulas (D-1) to (D-5), 2,6-diaminopyridine, 3,4-diaminopyridine, 2,4-diaminopyrimidine, 3,6-diaminoacridine, 3,6-diaminocarbazole, N-methyl-3,6-diaminocarbazole, N-ethyl-3,6-diaminocarbazole, N-phenyl-3,6-diaminocarbazole, N,N'-di(4-aminophenyl)-benzidine, compounds represented by the following formula (D-6) out of the compounds represented by the above formulas (D-I), compounds represented by the following formula (D-7) out of the compounds represented by the above formula (D-II), dodecanoxy-2,4-diaminobenzene, pentadecanoxy-2,4-diaminobenzene, hexadecanoxy-2,4-diaminobenzene, octadecanoxy-2,4-diaminobenzene, dodecanoxy-2,5-diaminobenzene, pentadecanoxy-2,5-diaminobenzene, hexadecanoxy-2,5-diaminobenzene, octadecanoxy-2,5-diaminobenzene and compounds represented by the following formulas (D-8) to (D-16) out of the compounds represented by the above formula (D-III), and 1,3-bis(3-aminopropyl)-tetramethyldisiloxane out of the compounds represented by the above formula (D-IV).

(D-6) 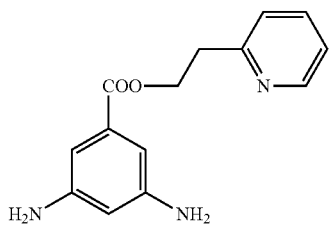

(D-7) 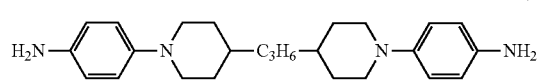

(D-8) 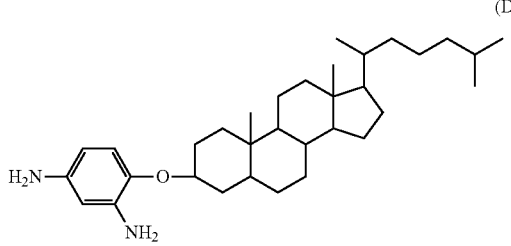

(D-9) 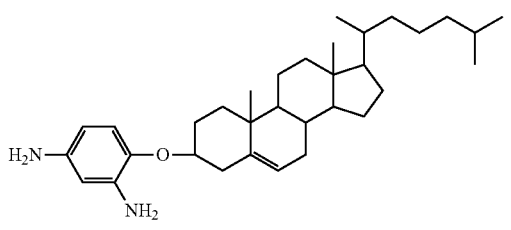

(D-10) 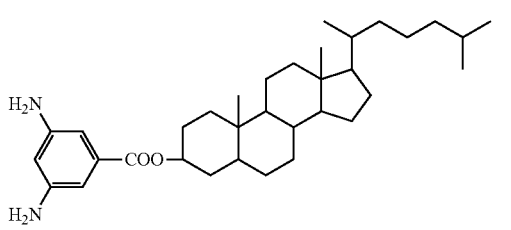

(D-11) 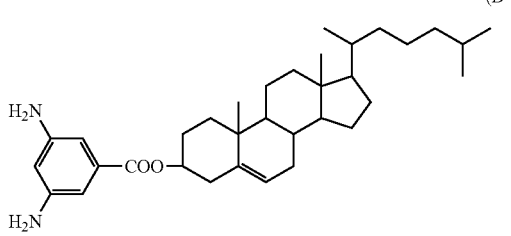

(D-12) 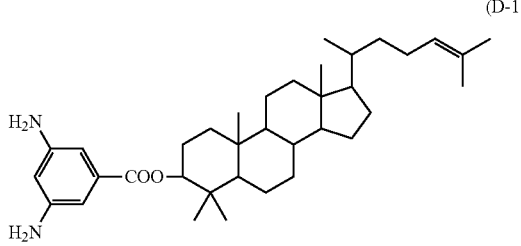

(D-13) 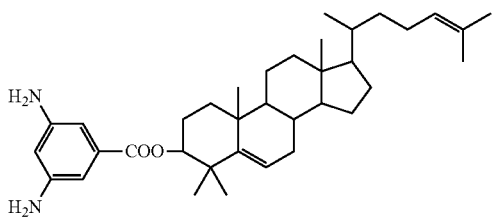

(D-14) 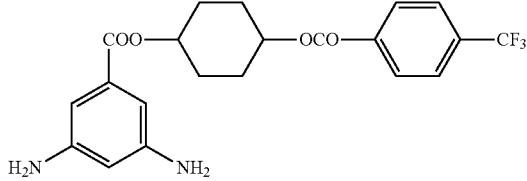

(D-15) 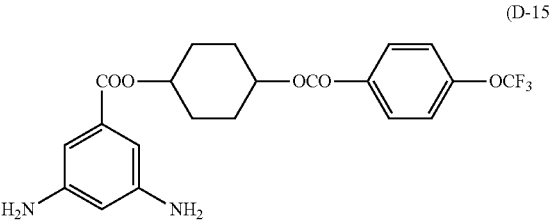

(D-16) 

As for the ratio of the tetracarboxylic dianhydride to the diamine used in the synthesis reaction of the polyamic acid, the amount of the acid anhydride group of the tetracarboxylic dianhydride is preferably 0.2 to 2 equivalents, more preferably 0.3 to 1.2 equivalents based on 1 equivalent of the amino group contained in the diamine.

The synthesis reaction of the polyamic acid is carried out preferably in an organic solvent at a temperature of preferably −20 to 150° C., more preferably 0 to 100° C. for preferably 0.5 to 24 hours, more preferably 2 to 10 hours. The organic solvent is not particularly limited if it can dissolve the synthesized polyamic acid. Examples of the organic solvent include aprotic polar solvents such as N-methyl-2-pyrrolidone, N,N-dimethylacetamide, N,N-dimethylformamide, N,N-dimethylimidazolidinone, dimethyl sulfoxide, γ-butyrolactone, tetramethylurea and hexamethylphosphortriamide; and phenolic solvents such as m-cresol, xylenol, phenol and halogenated phenol. The amount (a) of the organic solvent is set to ensure that the total amount (b) of the tetracarboxylic dianhydride and the diamine becomes preferably 0.1 to 50 wt %, more preferably 5 to 30 wt % based on the total amount (a+b) of the reaction solution. When the organic solvent and a poor solvent which will be described hereinafter are used in combination, it should be understood that the above "amount (a) of the organic solvent" means the total amount of the organic solvent and the poor solvent.

An alcohol, ketone, ester, ether, halogenated hydrocarbon or hydrocarbon which is generally believed to be a poor solvent for polyamic acid may be used in combination with the above organic solvent as long as the formed polyamic acid does not separate out. Examples of the poor solvent include methyl alcohol, ethyl alcohol, isopropyl alcohol, cyclohexanol, ethylene glycol, propylene glycol, 1,4-butanediol, triethylene glycol, ethylene glycol monomethyl ether, ethyl lactate, butyl lactate, acetone, methyl ethyl ketone, methyl isobutyl ketone, cyclohexanone, methyl acetate, ethyl acetate, butyl acetate, methyl methoxypropionate, ethyl ethoxypropionate, diethyl oxalate, diethyl malonate, diethyl ether, ethylene glycol methyl ether, ethylene glycol ethyl ether, ethylene glycol-n-propyl ether, ethylene glycol-i-propyl ether, ethylene glycol-n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, tetrahydrofuran, dichloromethane, 1,2-dichloroethane, 1,4-dichlorobutane, trichloroethane, chlorobenzene, o-dichlorobenzene, hexane, heptane, octane, benzene, toluene, xylene, isoamyl propionate, isoamyl isobutyrate and diisopentyl ether.

When the above poor solvent is used in combination with the organic solvent to produce the polyamic acid, the amount of the poor solvent which may be suitably set as long as the formed polyamic acid does not separate out is preferably not more than 50 wt % based on the total of all the solvents.

The reaction solution containing the polyamic acid dissolved therein is obtained as described above. This reaction solution may be used to prepare a liquid crystal aligning agent directly, or after the polyamic acid contained in the reaction solution is isolated or after the isolated polyamic acid is purified. The polyamic acid can be isolated by a method in which the above reaction solution is injected into a large amount of a poor solvent to obtain a precipitate and this precipitate is dried under reduced pressure or a method in which the reaction solution is distilled off under reduced pressure by means of an evaporator. The polyamic acid can be purified by a method in which the polyamic acid is dissolved in an organic solvent again and precipitated with a poor solvent or a method in which the step of distilling off the reaction solution under reduced pressure by means of an evaporator is carried out once or several times.

[Polyimide]

The above polyimide can be produced by dehydrating/ring-closing the polyamic acid obtained as described above. At this point, all of the amic acid structure may be dehydrated/ring closed to be completely imidized, or only part of the amic acid structure may be dehydrated/ring closed to obtain a partial imide having both an amic acid structure and an imide structure.

The dehydration/ring-closure reaction of the polyamic acid can be carried out by (i) a method in which the polyamic acid is heated or (ii) a method in which the polyamic acid is dissolved in an organic solvent and a dehydrating agent and a dehydration/ring-closing catalyst are added to the obtained solution and optionally heated.

In the above method (i) in which the polyamic acid is heated, the reaction temperature is preferably 50 to 200° C., more preferably 60 to 170° C. When the reaction temperature is lower than 50° C., the dehydration/ring-closure reaction does not proceed fully and when the reaction temperature is higher than 200° C., the molecular weight of the obtained polyimide may lower. In this method in which the polyamic acid is heated, the reaction time is preferably 0.5 to 48 hours, more preferably 2 to 20 hours.

Meanwhile, in the above method (ii) in which a dehydrating agent and a dehydration/ring-closing catalyst are added to the polyamic acid solution, an acid anhydride such as acetic anhydride, propionic anhydride or trifluoroacetic anhydride may be used as the dehydrating agent. The amount of the dehydrating agent is preferably 0.01 to 20 moles based on 1 mole of the structural unit of the polyamic acid. As the dehydration/ring-closing catalyst may be used a tertiary amine such as pyridine, collidine, lutidine or triethylamine. However, the dehydration/ring-closing catalyst is not limited to these. The amount of the dehydration/ring-closing catalyst is preferably 0.01 to 10 moles based on 1 mole of the dehydrating agent. Examples of the organic solvent used in the dehydration/ring-closure reaction are the same as the organic solvents enumerated above which are used to synthesize the polyamic acid. The reaction temperature of the dehydration/ring-closure reaction is preferably 0 to 180° C., more preferably 10 to 150° C., and the reaction time is preferably 0.5 to 20 hours, more preferably 1 to 8 hours.

The polyimide obtained in the above method (i) may be used to prepare a liquid crystal aligning agent directly or after the obtained polyimide is purified. Meanwhile, the reaction solution containing the polyimide is obtained in the above method (ii). This reaction solution may be used to prepare a liquid crystal aligning agent directly, or after the dehydrating agent and the dehydration/ring-closing catalyst are removed from the reaction solution, after the polyimide is isolated or after the isolated polyimide is purified. To remove the dehydrating agent and the dehydration/ring-closing catalyst from the reaction solution, means such as solvent substitution may be employed. The isolation and purification of the polyimide may be carried out by the same operations as in the method of isolating and purifying the polyamic acid.

[Another Polysiloxane]

At least one (another polysiloxane) selected from the group consisting of a polysiloxane having a recurring unit represented by the above formula (S-2), a hydrolysate thereof and a condensate of the hydrolysate is preferably a polyorganosiloxane of the above formula (S-2) in which $X^2$ is an alkyl group having 1 to 20 carbon atoms or aryl group having 6 to 20 carbon atoms.

The another polysiloxane has a weight average molecular weight in terms of polystyrene measured by gel permeation chromatography (GPC) of 500 to 100,000, preferably 1,000 to 50,000.

The above another polysiloxane can be synthesized by hydrolyzing or hydrolyzing/condensing at least one silane compound (to be referred to as "raw silane compound" hereinafter) selected from the group consisting of an alkoxysilane compound and a halogenated silane compound preferably in a suitable organic solvent in the present of water and a catalyst.

Examples of the raw silane compound which can be used herein include tetramethoxysilane, tetraethoxysilane, tetra-n-propoxysilane, tetra-iso-propoxysilane, tetra-n-butoxysilane, tetra-sec-butoxysilane, tetra-tert-butoxysilane and tetrachlorosilane; methyl trimethoxysilane, methyl triethoxysilane, methyl tri-n-propoxysilane, methyl tri-iso-propoxysilane, methyl tri-n-butoxysilane, methyl tri-sec-butoxysilane, methyl tri-tert-butoxysilane, methyl triphenoxysilane, methyl trichlorosilane, ethyl trimethoxysilane, ethyl triethoxysilane, ethyl tri-n-propoxysilane, ethyl tri-iso-propoxysilane, ethyl tri-n-butoxysilane, ethyl tri-sec-butoxysilane, ethyl tri-tert-butoxysilane, ethyl trichlorosilane, phenyl trimethoxysilane, phenyl triethoxysilane and phenyl trichlorosilane; dimethyl dimethoxysilane, dimethyl diethoxysilane and dimethyl dichlorosilane; and trimethylmethoxysilane, trimethylethoxysilane and trimethylchlorosilane. Out of these, preferred are tetramethoxysilane, tetraethoxysilane, methyl trimethoxysilane, methyl triethoxysilane, phenyl trimethoxysilane, phenyl triethoxysilane, dimethyl dimethoxysilane, dimethyl diethoxysilane, trimethyl methoxysilane and trimethyl ethoxysilane.

The organic solvent which may be optionally used to synthesize the another polysiloxane is selected from an alcohol compound, ketone compound, amide compound, ester compound and another aprotic compound. They may be used alone or in combination of two or more.

Examples of the above alcohol compound include monohydric alcohol compounds such as methanol, ethanol, n-propanol, i-propanol, n-butanol, i-butanol, sec-butanol, t-butanol, n-pentanol, i-pentanol, 2-methylbutanol, sec-pentanol, t-pentanol, 3-methoxybutanol, n-hexanol, 2-methylpentanol, sec-hexanol, 2-ethylbutanol, sec-heptanol, heptanol-3, n-octanol, 2-ethylhexanol, sec-octanol, n-nonyl alcohol, 2,6-dimethylheptanol-4, n-decanol, sec-undecyl alcohol, trimethylnonyl alcohol, sec-tetradecyl alcohol, sec-heptadecyl alcohol, phenol, cyclohexanol, methyl cyclohexanol, 3,3,5-trimethylcyclohexanol, benzyl alcohol and diacetone alcohol;
polyhydric alcohol compounds such as ethylene glycol, 1,2-propylene glycol, 1,3-butylene glycol, pentanediol-2,4,2-methylpentanediol-2,4, hexanediol-2,5, heptanediol-2,4,2-ethylhexanediol-1,3, diethylene glycol, dipropylene glycol, triethylene glycol and tripropylene glycol; and partial ethers of a polyhydric alcohol compound such as ethylene glycol monomethyl ether, ethylene glycol monoethyl ether, ethylene glycol monopropyl ether, ethylene glycol monobutyl ether, ethylene glycol monohexyl ether, ethylene glycol monophenyl ether, ethylene glycol mono-2-ethylbutyl ether, diethylene glycol monomethyl ether, diethylene glycol monoethyl ether, diethylene glycol monopropyl ether, diethylene glycol monobutyl ether, diethylene glycol monohexyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether and dipropylene glycol monopropyl ether. These alcohol compounds may be used alone or in combination of two or more.

Examples of the above ketone compound include monoketone compounds such as acetone, methyl ethyl ketone, methyl-n-propyl ketone, methyl-n-butyl ketone, diethyl ketone, methyl-i-butyl ketone, methyl-n-pentyl ketone, ethyl-n-butyl ketone, methyl-n-hexyl ketone, di-i-butyl ketone, trimethyl nonanone, cyclohexanone, 2-hexanone, methyl cyclohexanone, 2,4-pentanedione, acetonylacetone, acetophenone and fenchone; and
β-diketone compounds such as acetylacetone, 2,4-hexanedione, 2,4-heptanedione, 3,5-heptanedione, 2,4-octanedione, 3,5-octanedione, 2,4-nonanedione, 3,5-nonanedione, 5-methyl-2,4-hexanedione, 2,2,6,6-tetramethyl-3,5-heptanedione and 1,1,1,5,5,5-hexafluoro-2,4-heptanedione. These ketone compounds may be used alone or in combination of two or more.

Examples of the above amide compounds include formamide, N-methylformamide, N,N-dimethylformamide, N-ethylformamide, N,N-diethylformamide, acetamide, N-methylacetamide, N,N-dimethylacetamide, N-ethylacetamide, N,N-diethylacetamide, N-methylpropionamide, N-methylpyrrolidone, N-formylmorpholine, N-formylpiperidine, N-formylpyrrolidine, N-acetylmorpholine, N-acetylpiperidine and N-acetylpyrrolidine. These amide compounds may be used alone or in combination of two or more.

Examples of the above ester compound include diethyl carbonate, ethylene carbonate, propylene carbonate, diethyl carbonate, methyl acetate, ethyl acetate, γ-butyrolactone, γ-valerolactone, n-propyl acetate, i-propyl acetate, n-butyl acetate, i-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, propylene glycol monoethy ether acetate, propylene glycol monopropyl ether acetate, propylene glycol monobutyl ether acetate, dipropylene glycol monomethyl ether acetate, dipropylene glycol monoethyl ether acetate, glycol diacetate, methoxytriglycol acetate, ethyl propionate, n-butyl propionate, i-amyl propionate, diethyl oxalate, di-n-butyl oxalate, methyl lactate, ethyl lactate, n-butyl lactate, n-amyl lactate, diethyl malonate, dimethyl phthalate and diethyl phthalate. These ester compounds may be used alone or in combination of two or more.

Examples of the above another aprotic compound include acetonitrile, dimethyl sulfoxide, N,N,N',N'-tetraethyl sulfamide, hexamethylphosphoric triamide, N-methylmorpholone, N-methylpyrrole, N-ethylpyrrole, N-methyl-Δ3-pyrroline, N-methylpiperidine, N-ethylpiperidine, N,N-dimethylpiperazine, N-methyl imidazole, N-methyl-4-piperidone, N-methyl-2-piperidone, N-methyl-2-pyrrolidone, 1,3-dimethyl-2-imidazolidinone and 1,3-dimethyltetrahydro-2(1H)-pyrimidinone.

Out of these solvents, polyhydric alcohol compounds, partial ethers of a polyhydric alcohol compound and ester compounds are particularly preferred.

The amount of water used to synthesize the another polysiloxane is preferably 1.0 to 1.5 moles based on 1 mole of the total of the alkoxyl group and halogen atom of the raw silane compound. When water is used in the above ratio, the possibility that the hydrolyzable group of the raw silane compound remains unreacted as it is decreases, the storage stability of the liquid crystal aligning agent becomes higher, and the homogeneity of the coating film may not be impaired advantageously.

Examples of the catalyst which can be used to synthesize the another polysiloxane include a metal chelate compound, an organic acid, an inorganic acid, an organic base, ammonia and an alkali metal compound.

Examples of the above metal chelate compound include titanium chelate compounds such as triethoxy.mono(acetylacetonato)titanium, tri-n-propoxy.mono(acetylacetonato)titanium, tri-i-propoxy.mono(acetylacetonato)titanium, tri-n-butoxy.mono(acetylacetonato)titanium, tri-sec-butoxy.mono(acetylacetonato)titanium, tri-t-butoxy.mono(acetylacetonato)titanium, diethoxy.bis(acetylacetonato)titanium, di-n-propoxy.bis(acetylacetonato)titanium, di-i-propoxy.bis(acetylacetonato)titanium, di-n-butoxy.bis(acetylacetonato)titanium, di-sec-butoxy.bis(acetylacetonato)titanium, di-t-butoxy.bis(acetylacetonato)titanium, monoethoxy.tris(acetylacetonato)titanium, mono-n-propoxy.tris(acetylacetonato)titanium, mono-i-propoxy.tris(acetylacetonato)titanium, mono-n-butoxy.tris(acetylacetonato)titanium, mono-sec-butoxy.tris(acetylacetonato)titanium, mono-t-butoxy.tris(acetylacetonato)titanium, tetrakis(acetylacetonato)titanium, triethoxy.mono(ethylacetoacetate)titanium, tri-n-propoxy.mono(ethylacetoacetate)titanium, tri-i-propoxy.mono(ethylacetoacetate)titanium, tri-n-butoxy.mono(ethylacetoacetate)titanium, tri-sec-butoxy.mono(ethylacetoacetate)titanium, tri-t-butoxy.mono (ethylacetoacetate)titanium, diethoxy.bis(ethylacetoacetate)titanium, di-n-propoxy.bis(ethylacetoacetate)titanium, di-i-propoxy.bis(ethylacetoacetate)titanium, di-n-butoxy.bis(ethylacetoacetate)titanium, di-sec-butoxy.bis(ethylacetoacetate)titanium, di-t-butoxy.bis(ethylacetoacetate)titanium, monoethoxy.tris(ethylacetoacetate)titanium, mono-n-propoxy.tris(ethylacetoacetate)titanium, mono-i-propoxy.tris(ethylacetoacetate)titanium, mono-n-butoxy.tris(ethylacetoacetate)titanium, mono-sec-butoxy.tris(ethylacetoacetate)titanium, mono-t-butoxy.tris(ethylacetoacetate)titanium, tetrakis(ethylacetoacetate)titanium, mono(acetylacetonato)tris(ethylacetoacetate)titanium, bis(acetylacetonato)bis(ethylacetoacetate)titanium and tris(acetylacetonato)mono(ethylacetoacetate)titanium; zirconium chelate compounds such as triethoxy.mono(acetylacetonato)zirconium, tri-n-propoxy.mono(acetylacetonato)zirconium, tri-i-propoxy.mono(acetylacetonato)zirconium, tri-n-butoxy.mono(acetylacetonato)zirconium, tri-sec-butoxy.mono(acetylacetonato)zirconium, tri-t-butoxy.mono(acetylacetonato)zirconium, diethoxy.bis(acetylacetonato)zirconium, di-n-propoxy.bis(acetylacetonato)zirconium, di-i-propoxy.bis(acetylacetonato)zirconium, di-n-butoxy.bis(acetylacetonato)zirconium, di-sec-butoxy.bis(acetylacetonato)zirconium, di-t-butoxy.bis(acetylacetonato)zirconium, monoethoxy.tris(acetylacetonato)zirconium, mono-n-propoxy.tris(acetylacetonato)zirconium, mono-i-propoxy.tris(acetylacetonato)zirconium, mono-n-butoxy.tris(acetylacetonato)zirconium, mono-sec-butoxy.tris(acetylacetonato)zirconium, mono-t-butoxy.tris(acetylacetonato)zirconium, tetrakis(acetylacetonato)zirconium, triethoxy.mono(ethylacetoacetate)zirconium, tri-n-propoxy.mono(ethylacetoacetate)zirconium, tri-i-propoxy.mono(ethylacetoacetate)zirconium, tri-n-butoxy.mono(ethylacetoacetate)zirconium, tri-sec-butoxy.mono(ethylacetoacetate)zirconium, tri-t-butoxy.mono(ethylacetoacetate)zirconium, diethoxy.bis(ethylacetoacetate)zirconium, di-n-propoxy.bis(ethylacetoacetate)zirconium, di-i-propoxy.bis(ethylacetoacetate)zirconium, di-n-butoxy.bis(ethylacetoacetate)zirconium, di-sec-butoxy.bis(ethylacetoacetate)zirconium, di-t-butoxy.bis(ethylacetoacetate)zirconium, monoethoxy.tris(ethylacetoacetate)zirconium, mono-n-propoxy.tris(ethylacetoacetate)zirconium, mono-i-propoxy.tris(ethylacetoacetate)zirconium, mono-n-butoxy.tris(ethylacetoacetate)zirconium, mono-sec-butoxy.tris(ethylacetoacetate)zirconium, mono-t-butoxy.tris(ethylacetoacetate)zirconium, tetrakis(ethylacetoacetate)zirconium, mono(acetylacetonato)tris(ethylacetoacetate)zirconium, bis(acetylacetonato)bis(ethylacetoacetate)zirconium and tris(acetylacetonato)mono(ethylacetoacetate)zirconium; and aluminum chelate compounds such as tris(acetylacetonato)aluminum and tris(ethylacetoacetate)aluminum.

Examples of the above organic acid include acetic acid, propionic acid, butanoic acid, pentanoic acid, hexanoic acid, heptanoic acid, octanoic acid, nonanoic acid, decanoic acid, oxalic acid, maleic acid, methylmalonic acid, adipic acid, sebacic acid, gallic acid, butyric acid, mellitic acid, arachidonic acid, mhikimic acid, 2-ethylhexanoic acid, oleic acid, stearic acid, linoleic acid, linolenic acid, salicylic acid, benzoic acid, p-aminobenzoic acid, p-toluenesulfonic acid, benzenesulfonic acid, monochloroacetic acid, dichloroacetic acid, trichloroacetic acid, trifluoroacetic acid, formic acid, malonic acid, sulfonic acid, phthalic acid, fumaric acid, citric acid and tartaric acid.

Examples of the above inorganic acid include hydrochloric acid, nitric acid, sulfuric acid, hydrofluoric acid and phosphoric acid.

Examples of the above organic base include pyridine, pyrrole, piperazine, pyrrolidine, piperidine, picoline, trimethylamine, triethylamine, monoethanolamine, diethanolamine, dimethyl monoethanolamine, monomethyl diethanolamine, triethanolamine, diazabicycloocrane, diazabicyclononane, diazabicycloundecene and tetramethylammonium hydroxide.

Examples of the above alkali metal compound include sodium hydroxide, potassium hydroxide, barium hydroxide and calcium hydroxide.

These catalysts may be used alone or in combination of two or more.

Out of these catalysts, metal chelate compounds, organic acids and inorganic acids are preferred, and titanium chelate compounds and organic acids are more preferred.

The amount of the catalyst is preferably 0.001 to 10 parts by weight, more preferably 0.001 to 1 part by weight based on 100 parts by weight of the raw silane compound.

Water which is added to synthesize the another polysiloxane may be added to a silane compound as the raw material or a solution prepared by dissolving the silane compound in an organic solvent intermittently or continuously.

The catalyst may be added to the silane compound as the raw material or a solution prepared by dissolving the silane compound in an organic solvent in advance, or dissolved or dispersed in water to be added.

The reaction temperature for the synthesis of the another polysiloxane is preferably 0 to 100° C., more preferably 15 to 80° C. The reaction time is preferably 0.5 to 48 hours, more preferably 1 to 24 hours.

[Content of Another Polymer]

When the liquid crystal aligning agent of the present invention contains the above-described liquid crystal aligning polyorganosiloxane and another polymer, the content of the another polymer is preferably not more than 100,000 parts by weight based on 100 parts by weight of the radiation sensitive polyorganosiloxane. The more preferred content of the another polymer differs according to the type of the another polymer.

When the liquid crystal aligning agent of the present invention contains the liquid crystal aligning polyorganosiloxane and at least one polymer selected from the group consisting of a polyamic acid and a polyimide, as for the preferred ratio of these materials, the total content of the polyamic acid and the polyimide is preferably 100 to 50,000 parts by weight, more preferably 200 to 20,000 parts by weight based on 100 parts by weight of the liquid crystal aligning polyorganosiloxane.

When the liquid crystal aligning agent of the present invention contains the liquid crystal aligning polyorganosiloxane and another polysiloxane, as for the preferred ratio of these materials, the content of the another polysiloxane is preferably 100 to 10,000 parts by weight, more preferably 100 to 2,000 parts by weight based on 100 parts by weight of the liquid crystal aligning polysiloxane of the present invention.

When the liquid crystal aligning agent of the present invention contains the liquid crystal aligning polyorganosiloxane and another polymer, the another polymer is preferably at least one polymer selected from the group consisting of a polyamic acid and a polyimide, or another polysiloxane.

[Heat-Sensitive Crosslinking Agent]

The above heat-sensitive crosslinking agent may be used to stabilize the pretilt angle and improve the strength of the coating film. As the heat-sensitive crosslinking agent, for example, a polyfunctional epoxy compound is effective.

Examples of the polyfunctional epoxy compound include bisphenol A type epoxy resin, phenol novolak type epoxy resin, cresol novolak type epoxy resin, cyclic aliphatic epoxy resin, glycidyl ester-based epoxy resin, glycidyl diamine-based epoxy resin, heterocyclic epoxy resin and acrylic resin having an epoxy group. Commercially available products of these resins include Epolight 400E and 3002 (of Kyoeisha Chemical Co., Ltd.) and Epicoat 828 and 152 and Epoxy Novolak 180S (of Japan Epoxy Resins Co., Ltd.). When a polyfunctional epoxy compound is used as the heat-sensitive crosslinking agent, a basic catalyst such as 1-benzyl-2-methylimidazole may be used in combination with the compound to cause a crosslinking reaction efficiently.

[Functional Silane Compound]

The above functional silane compound may be used to improve adhesion between the obtained liquid crystal alignment film and the substrate. Examples of the functional silane compound include 3-aminopropyl trimethoxysilane, 3-aminopropyl triethoxysilane, 2-aminopropyl trimethoxysilane, 2-aminopropyl triethoxysilane, N-(2-aminoethyl)-3-aminopropyl trimethoxysilane, N-(2-aminoethyl)-3-aminopropylmethyl dimethoxysilane, 3-ureidopropyl trimethoxysilane, 3-ureidopropyl triethoxysilane, N-ethoxycarbonyl-3-aminopropyl trimethoxysilane, N-ethoxycarbonyl-3-aminopropyl triethoxysilane, N-triethoxysilylpropyl triethylenetriamine, N-trimethoxysilylpropyl triethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyl trimethoxysilane, N-benzyl-3-aminopropyl triethoxysilane, N-phenyl-3-aminopropyl trimethoxysilane, N-phenyl-3-aminopropyl triethoxysilane, N-bis(oxyethylene)-3-aminopropyl trimethoxysilane, N-bis(oxyethylene)-3-aminopropyl triethoxysilane, 3-glycidoxypropyl trimethoxysilane and 2-(3,4-epoxycyclohexyl)ethyl trimethoxysilane. Further, a reaction product of a tetracarboxylic dianhydride and a silane compound having an amino group as disclosed by JP-A 63-291922 may also be used.

[Surfactant]

Examples of the above surfactant include a nonionic surfactant, an anionic surfactant, a cationic surfactant, amphoteric surfactant, a silicone surfactant, a polyalkylene oxide surfactant and a fluorine-containing surfactant.

<Liquid Crystal Aligning Agent>

The liquid crystal aligning agent of the present invention contains the liquid crystal aligning polyorganosiloxane as an essential component and optionally other components as described above and is preferably prepared as a composition solution obtained by dissolving these components in an organic solvent.

Preferably, the organic solvent which can be used to prepare the liquid crystal aligning agent of the present invention dissolves the liquid crystal aligning polyorganosiloxane and optional other components and does not react with these.

The organic solvent which can be preferably used for the liquid crystal aligning agent of the present invention differs according to the type of the another polymer which is optionally added.

Preferred examples of the organic solvent which is used when the liquid crystal aligning agent of the present invention contains the radiation sensitive polyorganosiloxane and at least one polymer selected from the group consisting of a polyamic acid and a polyimide are organic solvents enumerated above which are used in the synthesis reaction of the polyamic acid. A suitable poor solvent may be selected from among the poor solvents enumerated above which may be used in the synthesis reaction of the polyamic acid in combination with the above organic solvent.

When the liquid crystal aligning agent of the present invention contains only the radiation sensitive polyorganosiloxane as a polymer, or when the liquid crystal aligning agent contains the radiation sensitive polyorganosiloxane and the another polysiloxane, preferred examples of the organic solvent include 1-ethoxy-2-propanol, propylene glycol monoethyl ether, propylene glycol monopropyl ether, propylene glycol monobutyl ether, propylene glycol monoacetate, dipropylene glycol methyl ether, dipropylene glycol ethyl ether, dipropylene glycol propyl ether, dipropylene glycol dimethyl ether, ethylene glycol monomethyl ether, ethylene glycol monoethyl ether, ethylene glycol monopropyl ether, ethylene glycol monobutyl ether (butyl cellosolve), ethylene glycol monoamyl ether, ethylene glycol monohexyl ether, diethylene glycol, methyl cellosolve acetate, ethyl cellosolve acetate, propyl cellosolve acetate, butyl cellosolve acetate, methyl carbitol, ethyl carbitol, propyl carbitol, butyl carbitol, n-propyl acetate, i-propyl acetate, n-butyl acetate, i-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, n-hexyl acetate, cyclohexyl acetate, octyl acetate, amyl acetate and isoamyl acetate. Out of these, n-propyl acetate, i-propyl acetate, n-butyl acetate, i-butyl acetate, sec-butyl acetate, n-pentyl acetate and sec-pentyl acetate are preferred.

The preferred solvent used for the preparation of the liquid crystal aligning agent of the present invention is one or a mixture of two or more of the organic solvents listed above and ensures that the components contained in the liquid crystal aligning agent do not separate out when the solids content is in the preferred range below and that the surface tension of the liquid crystal aligning agent falls within the range of 20 to 50 mN/m.

The solids content (the ratio of the total weight of all the components except for the solvent in the liquid crystal aligning agent to the whole weight of the liquid crystal aligning agent) of the liquid crystal aligning agent of the present invention is selected in consideration of viscosity and volatility. It is preferably 1 to 10 wt %. That is, the liquid crystal aligning agent of the present invention is applied to the surface of a substrate to form a coating film which will become a liquid crystal alignment film. When the solids content is lower than 1 wt %, the thickness of this coating film becomes too small, thereby making it difficult to obtain a satisfactory liquid crystal alignment film. When the solids content is higher than 10 wt %, the thickness of the coating film becomes too large, thereby making it difficult to obtain a satisfactory liquid crystal alignment film as well, and the viscosity of the liquid crystal aligning agent increases, thereby deteriorating coating properties.

The particularly preferred solids content differs according to means of applying the liquid crystal aligning agent to the substrate. For example, when spinner coating is employed, the solids content is particularly preferably 1.5 to 4.5 wt %. In the case of printing, the solids content is particularly preferably set to 3 to 9 wt %, thereby adjusting the solution viscosity to 12 to 50 mPa·s. In the case of ink jet coating, the solids content is particularly preferably set to 1 to 0.5 wt %, thereby adjusting the solution viscosity to 3 to 15 mPa·s.

The temperature for the preparation of the liquid crystal aligning agent of the present invention is preferably 0 to 200° C., more preferably 20 to 60° C.

<Liquid Crystal Display Device>

The liquid crystal display device of the present invention comprises a liquid crystal alignment film formed from the above-described liquid crystal aligning agent of the present invention.

The liquid crystal display device of the present invention can be manufactured by the following method.

The liquid crystal aligning agent of the present invention is first applied to the transparent conductive film formed side of a substrate having a patterned transparent conductive film by a suitable coating technique such as roll coating, spinner coating, printing or ink jet coating. Thereafter, the coated surface is prebaked and then post-baked. The prebaking temperature is preferably 30 to 200° C., more preferably 40 to 150° C., particularly preferably 40 to 100° C. The prebaking time is preferably 0.5 to 10 minutes, more preferably 0.5 to 5 minutes. The post-baking temperature is preferably 80 to 300° C., more preferably 120 to 250° C. The post-baking time is preferably 5 to 180 minutes, more preferably 10 to 120 minutes. The thickness of the coating film formed as described above is preferably 0.001 to 1 μm, more preferably 0.005 to 0.5 μm as a thickness of after prebaking and post-baking.

As the above substrate may be used a transparent substrate obtained from glass such as float glass or soda glass, or resin such as polyethylene terephthalate, polybutylene terephthalate, polyether sulfone, polycarbonate, poly(alicyclic olefin) or a hydrogenated product of a poly(alicyclic olefin).

As the above transparent conductive film may be used a NESA film made of $SnO_2$ or an ITO film made of $In_2O_3$—$SnO_2$. To form the patterned transparent conductive film, a transparent conductive film without a pattern is first formed and then a pattern is formed by photoetching, or a mask having a desired pattern is used at the time of forming a transparent conductive film to form the patterned transparent conductive film directly. For the application of the liquid crystal aligning agent, to further improve adhesion of the coating film to the substrate and the transparent conductive film, a functional silane compound or a titanate may be applied to the substrate and the transparent conductive film in advance.

When a liquid crystal alignment film formed from the liquid crystal aligning agent of the present invention is used in a horizontal alignment type liquid crystal display device, the formed coating film is then rubbed in a fixed direction with a roll wound with nylon, rayon or cotton fiber cloth. The coating film is provided with liquid crystal molecule alignability by this rubbing to become a liquid crystal alignment film. Further, the view field characteristics of the obtained horizontal alignment type liquid crystal display device can be improved by carrying out a treatment for changing the pretilt angle by applying ultraviolet radiation to part of the liquid crystal alignment film formed from the liquid crystal aligning agent of the present invention as disclosed by JP-A 6-222366 and JP-A 6-281937, or a treatment for forming a resist film on part of the surface of the formed liquid crystal alignment film, rubbing the liquid crystal alignment film in a direction different from the above rubbing direction, and removing the resist film so that the liquid crystal alignment film can have different liquid crystal alignability in each region as disclosed by JP-A 5-107544.

When the liquid crystal alignment film is used in a homeotropic alignment type liquid crystal display device, this rubbing may not be carried out.

Two substrates having this liquid crystal alignment film formed as described above are prepared, and liquid crystals are interposed between the two substrates to fabricate a liquid crystal cell. To fabricate the liquid crystal cell, for example, the following two processes may be employed.

The first process is a conventionally known process. First, two substrates are opposed to each other through a cell gap in such a manner that the liquid crystal alignment films of these substrates are opposed to each other, a sealing agent is used to join together the peripheral portions of the two substrates, liquid crystals are injected into the cell gap defined by the surfaces of the substrates and the sealing agent to fill the gap, and an injection hole is closed up to fabricate the liquid crystal cell.

The second process is called "ODF (One Drop Fill) process". An ultraviolet curable sealing agent is applied to a predetermined position of one of the two substrates having a liquid crystal alignment film, liquid crystals are dropped on the surface of the liquid crystal alignment film, the other substrate is joined to the above substrate in such a manner that the liquid crystal alignment films of these substrates are opposed to each other, and ultraviolet radiation is applied to the entire surfaces of the substrates to cure the sealing agent so as to fabricate the liquid crystal cell. Since the light resistance of the liquid crystal alignment film formed from the liquid crystal aligning agent of the present invention is extremely high, the performance of the liquid crystal alignment film is not diminished by the application of ultraviolet radiation in the ODF process.

In all of the above processes, it is desired that flow alignment at the time of filling the liquid crystals should be removed by gradually cooling the liquid crystal cell down to room temperature after the liquid crystal cell is heated until the liquid crystals used take an isotropic phase.

Then, the liquid crystal display device of the present invention can be obtained by putting a polarizing plate on the outer surfaces of the liquid crystal cell.

As the above sealing agent may be used epoxy resin containing aluminum oxide spheres as a spacer and a curing agent.

As the above liquid crystals may be used nematic liquid crystals or smectic liquid crystals. To fabricate a liquid crystal display device having a TN liquid crystal cell or an STN liquid crystal cell, nematic liquid crystals having positive dielectric anisotropy (positive liquid crystals) are preferred, such as biphenyl-based liquid crystals, phenylcyclohexane-based liquid crystals, ester-based liquid crystals, terphenyl-based liquid crystals, biphenylcyclohexane-based liquid crystals, pyrimidine-based liquid crystals, dioxane-based liquid crystals, bicyclooctane-based liquid crystals and cubane-based liquid crystals. Cholesteric liquid crystals such as cholestyl chloride, cholesteryl nonaate and cholesteryl carbonate; chiral agents marketed under the trade names of C-15 and CB-15 (of Merck KGaA); and ferroelectric liquid crystals such as p-decyloxybenzilidene-p-amino-2-methylbutyl cinnamate may be further added to these liquid crystals.

In the case of a homeotropic alignment type liquid crystal cell, nematic liquid crystals having negative dielectric anisotropy (negative liquid crystals) are preferred, such as dicyanobenzene-based liquid crystals, pyridazine-based liquid crystals, Schiff base-based liquid crystals, azoxy-based liquid crystals, biphenyl-based liquid crystals and phenylcyclohexane-based liquid crystals.

The polarizing plate placed on the outer sides of the liquid crystal cell is a polarizing plate produced by sandwiching a polarizing film called "H film" which has absorbed iodine while polyvinyl alcohol is stretched and oriented between cellulose acetate protective films, or a polarizing plate composed of the H film itself.

The liquid crystal display device of the present invention fabricated as described above has excellent heat resistance and light resistance, rarely experiences a reduction in voltage holding ratio even when it is exposed to high-intensity light in a high-temperature environment, and is free from the deterioration of liquid crystal alignability.

EXAMPLES

The following examples are provided for the purpose of further illustrating the present invention but are in no way to be taken as limiting.

The weight average molecular weight Mw is a value in terms of polystyrene measured by gel permeation chromatography under the following conditions.

Column: TSK-GEL of Tosoh Corporation
Solvent: tetrahydrofuran
Column temperature: 40° C.
Pressure: 80 kgf/cm$^2$ The epoxy equivalent was measured in accordance with the "hydrochloric acid-methyl ethyl ketone method" specified in JIS C 2105.

Synthesis of Reactive Polyorganosiloxane

Synthesis Example 1

100.0 g of 2-(3,4-epoxycyclohexyl)ethyl trimethoxysilane (ECETS), 500 g of methyl isobutyl ketone and 10.0 g of triethylamine were fed to a reactor equipped with a stirrer, a thermometer, a dropping funnel and a reflux cooling tube and mixed together at room temperature. After 100 g of deionized water was added dropwise to the resulting mixture from the dropping funnel over 30 minutes, a reaction was carried out at 80° C. for 6 hours while it was mixed under reflux. After the end of the reaction, an organic layer was taken out and washed with a 0.2 wt % ammonium nitrate aqueous solution until water after washing became neutral, and the solvent and water were distilled off under reduced pressure to obtain a reactive polyorganosiloxane EPS-1 as a viscous transparent liquid.

When this reactive polyorganosiloxane was analyzed by $^1$H-NMR, a peak assigned to the epoxy group and having theoretical intensity was seen at around a chemical shift (δ) of 3.2 ppm. Thus, it was confirmed that the side reaction of the epoxy group did not occur during the reaction.

The weight average molecular weight Mw and epoxy equivalent of this reactive polyorganosiloxane are shown in Table 1.

The operation of this Synthesis Example 1 was repeated on the same scale as above to obtain the required amount of EPS-1 used in the following examples and comparative examples.

Synthesis Examples 2 and 3

Reactive polyorganosiloxanes EPS-2 and EPS-3 were obtained as viscous transparent liquids in the same manner as in Synthesis Example 1 except that the types and amounts (mole %) of the charged raw materials were changed as shown in Table 1 while the total weight of the charged raw materials was kept at 100 g.

The weight average molecular weights Mw and epoxy equivalents of these reactive polyorganosiloxanes are shown in Table 1.

In Table 1, the symbols of the raw silane compounds denote the following compounds.
ECETS: 2-(3,4-epoxycyclohexyl)ethyl trimethoxysilane
MTMS: methyl trimethoxysilane
PTMS: phenyl trimethoxysilane

TABLE 1

| | Name of reactive polyorgano- siloxane | Raw silane compound (mole %) | | | Mw | Epoxy equivalent (g/mole) |
|---|---|---|---|---|---|---|
| | | ECETS | MTMS | PTMS | | |
| Synthesis Example 1 | EPS-1 | 100 | 0 | 0 | 3,500 | 180 |
| Synthesis Example 2 | EPS-2 | 50 | 50 | 0 | 4,200 | 240 |
| Synthesis Example 3 | EPS-3 | 50 | 0 | 50 | 3,800 | 301 |

Synthesis of Liquid Crystal Aligning Polyorganosiloxane

Example 1

10.0 g of EPS-1 synthesized as the reactive polysiloxane in the above Synthesis Example 1, 30.28 g of methyl isobutyl ketone as a solvent, 3.82 g of stearic acid as the compound (1) which is a reactive compound and 0.10 g of UCAT 18X (trade name, curing accelerator for epoxy compounds of San-Apro Limited) were fed to a 200 mL three-necked flask so as to carry out a reaction under agitation at 100° C. for 48 hours. After the end of the reaction, a solution obtained by adding ethyl acetate to the reaction mixture was washed with water 3 times, an organic layer was dried with magnesium sulfate, and the solvent was distilled off to obtain 8.1 g of a liquid crystal aligning polyorganosiloxane APS-1. The weight average molecular weight of APS-1 was 10,100.

Examples 2 to 13 and Comparative Examples 1 to 4

Liquid crystal aligning polyorganosiloxanes APS-2 to APS-13 and RPS-1 to RPS-4 were synthesized in the same manner as in Example 1 except that the types and amounts of the reactive polysiloxane and the reactive compound were changed as shown in Table 2.

The yields and weight average molecular weights Mw of these liquid crystal aligning polyorganosiloxanes are shown in Table 2.

In Table 2, the symbols of the compound (1), the compound (2) and the compound (3) denote the following compounds.
[Compound (1)]
  SA: stearic acid
  DOBA: 4-dodecyloxybenzoic acid
  MOBA: 4-methoxybenzoic acid
  DBPC: 4-(4'-dodecylbiphenyl)carboxylic acid
  PBPC: 4-(4'-propylbiphenyl)carboxylic acid
[Compound (2)]
  AA: acrylic acid
  MAA: methacrylic acid
[Compound (3)]
  FMBA: 4-trifluoromethylbenzoic acid
  HBBA: 4-(hydroxymethyl)benzoic acid

TABLE 2

| Name of liquid crystal aligning polyorgano-siloxane | Reactive polyorgano-siloxane | | Reactive compound | | | | | | Yield (g) | Mw |
|---|---|---|---|---|---|---|---|---|---|---|
| | | | Compound (1) | | Compound (2) | | Compound (3) | | | |
| | Type | Amount (g) | Type | Amount (g) | Type | Amount (g) | Type | Amount (g) | | |
| Ex. 1 | APS-1 | EPS-1 | 10.00 | SA | 3.82 | — | 0 | — | 0 | 8.1 | 10,100 |
| Ex. 2 | APS-2 | EPS-2 | 11.82 | SA | 3.82 | — | 0 | — | 0 | 8.2 | 15,200 |
| Ex. 3 | APS-3 | EPS-3 | 14.92 | SA | 3.82 | — | 0 | — | 0 | 10.2 | 9,500 |
| Ex. 4 | APS-4 | EPS-1 | 10.00 | DOBA | 3.98 | — | 0 | — | 0 | 9.0 | 9,900 |
| Ex. 5 | APS-5 | EPS-2 | 11.82 | DOBA | 3.98 | — | 0 | — | 0 | 8.6 | 9,900 |
| Ex. 6 | APS-6 | EPS-3 | 14.92 | DOBA | 3.98 | — | 0 | — | 0 | 8.8 | 9,400 |
| Ex. 7 | APS-7 | EPS-1 | 10.00 | MOBA | 4.23 | — | 0 | — | 0 | 12.2 | 9,000 |
| Ex. 8 | APS-8 | EPS-1 | 10.00 | DBPC | 10.18 | — | 0 | — | 0 | 18.9 | 12,400 |
| Ex. 9 | APS-9 | EPS-1 | 10.00 | PBPC | 6.68 | — | 0 | — | 0 | 15.2 | 11,000 |
| Ex. 10 | APS-10 | EPS-1 | 10.00 | DOBA | 8.51 | AA | 0.80 | — | 0 | 17.6 | 10,700 |
| Ex. 11 | APS-11 | EPS-1 | 10.00 | MOBA | 4.23 | MAA | 0.96 | — | 0 | 14.0 | 9,300 |
| Ex. 12 | APS-12 | EPS-1 | 10.00 | DOBA | 8.51 | — | 0 | FMBA | 2.11 | 19.1 | 10,900 |
| Ex. 13 | APS-13 | EPS-1 | 10.00 | MOBA | 4.23 | — | 0 | HBBA | 1.69 | 14.6 | 9,900 |
| C. Ex. 1 | RPS-1 | EPS-1 | 10.00 | — | 0 | AA | 0.80 | — | 0 | 9.0 | 4,000 |
| C. Ex. 2 | RPS-2 | EPS-1 | 10.00 | — | 0 | MAA | 0.96 | — | 0 | 9.2 | 4,200 |
| C. Ex. 3 | RPS-3 | EPS-1 | 10.00 | — | 0 | — | 0 | FMBA | 2.11 | 10.6 | 4,500 |
| C. Ex. 4 | RPS-4 | EPS-1 | 10.00 | — | 0 | — | 0 | HBBA | 1.69 | 10.1 | 4,500 |

Ex.: Example
C. Ex.: Comparative Example

Synthesis of Another Polymer

Synthesis of Polyamic Acid

Synthesis Example 4

19.61 g (0.1 mole) of cyclobutanetetracarboxylic dianhydride and 21.23 g (0.1 mole) of 4,4'-diamino-2,2'-dimethylbiphenyl were dissolved in 367.6 g of N-methyl-2-pyrrolidone to carry out a reaction at room temperature for 6 hours. Thereafter, the reaction mixture was injected into an excessive amount of methanol to precipitate a reaction product. The precipitate was washed with methanol and dried at 40° C. under reduced pressure for 15 hours to obtain 35 g of a polyamic acid PA-1.

Synthesis Example 5

22.4 g (0.1 mole) of 2,3,5-tricarboxycyclopentylacetic dianhydride and 14.23 g (0.1 mole) of cyclohexanebis(methylamine) were dissolved in 329.3 g of N-methyl-2-pyrrolidone to carry out a reaction at 60° C. for 6 hours. Thereafter, the reaction mixture was injected into an excessive amount of methanol to precipitate a reaction product. The precipitate was washed with methanol and dried at 40° C. under reduced pressure for 15 hours to obtain 32 g of a polyamic acid PA-2.

Synthesis Example 6

22.4 g (0.1 mole) of 2,3,5-tricarboxycyclopentylacetic dianhydride and 10.8 g (0.1 mole) of paraphenylenediamine were dissolved in 298.8 g of N-methyl-2-pyrrolidone to carry out a reaction at 60° C. for 6 hours so as to obtain 332.0 g of a solution containing a polyamic acid PA-3.

Synthesis of Polyimide

Synthesis Example 7

3.8 g of pyridine and 4.9 g of acetic anhydride were added to a solution prepared by dissolving 17.5 g of the polyamic acid PA-2 obtained in the above Synthesis Example 5 in 232.5 g of N-methyl-2-pyrrolidone to carry out a dehydration/ring-closure reaction at 120° C. for 4 hours. Thereafter, the reaction mixture was injected into an excessive amount of methanol to precipitate a reaction product. The precipitate was washed with methanol and dried under reduced pressure for 15 hours to obtain 15 g of a polyimide PI-1.

Synthesis Example 8

A solution containing a polyamic acid was obtained in the same manner as in the above Synthesis Example 6. 39.5 g of pyridine and 30.6 g of acetic anhydride were added to the resulting solution to carry out a dehydration/ring-closure reaction at 120° C. for 4 hours. After the end of the reaction, the reaction mixture was concentrated by using a rotary evaporator to obtain 166.0 g of a solution containing a polyimide PI-2.

Synthesis of Another Polysiloxane

Synthesis Example 9

20.8 g of tetraethoxysilane and 28.2 g of 1-ethoxy-2-propanol were fed to a 200 mL three-necked flask equipped with a cooling tube, heated at 60° C. and stirred. A maleic anhydride aqueous solution prepared in a different 20 mL flask by dissolving 0.26 g of maleic anhydride in 10.8 g of water was added to the resulting mixture and stirred at 60° C. for another 4 hours to carry out a reaction. The solvent was distilled off from the obtained reaction solution, and 1-ethoxy-2-propanol was added to concentrate the reaction solution again so as to obtain a solution containing 10 wt % of another polysiloxane PS-1. When the weight average molecular weight of the another polysiloxane PS-1 was measured, it was 5,100.

Preparation of Liquid Crystal Aligning Agent and Evaluation of Storage Stability Example 14

100 parts by weight of the liquid crystal aligning polyorganosiloxane APS-1 synthesized in the above Example 1 and 1,000 parts by weight of the polyamic acid PA-1 synthesized in the above Synthesis Example 4 as the another polymer were dissolved in a mixed solvent of N-methyl-2-pyrrolidone and butyl cellosolve (weight ratio of 50:50) to prepare a solution having a solids content of 3.0 wt %. This solution was filtered with a filter having an opening diameter of 1 µm to prepare a liquid crystal aligning agent S-1.

When the storage stability of this liquid crystal aligning agent S-1 was evaluated in three-grade evaluation, by the following method based on the following criteria, the storage stability of the liquid crystal aligning agent S-1 was ⊚ (excellent).

[Method of Evaluating Storage Stability]

The liquid crystal aligning agent S-1 was applied to a glass substrate by spin coating with the number of revolutions as a variable and heated on a hot plate at 80° C. for 1 minute to find the number of revolutions at which the thickness of the coating film after the removal of the solvent became 500 Å.

Then, part of the liquid crystal aligning agent S-1 was collected and stored at −15° C. for 5 weeks. When the liquid crystal aligning agent after storage was observed with the eye and the precipitation of an undissolved product was seen, the storage stability was judged as X (unacceptable).

When no undissolved product was seen after 5 weeks of storage, the liquid crystal aligning agent S-1 after storage was applied to a glass substrate by spin coating at the number of revolutions at which the film thickness became 500 Å before storage, and the solvent was removed in the same manner as above to form a coating film. The film thickness of this coating film was measured to check a difference from 500 Å. When this film thickness was 10 to 15% larger or smaller than 500 Å, the storage stability was judged as ○ (acceptable) and when the film thickness was less than 10% larger or smaller than 500 Å, the storage stability was judged as ⊚ (excellent).

The thickness of the above coating film was measured by using the tracer type uneven film thickness meter of KLA-Tencor Corporation.

Examples 15 to 27, 30 to 37 and 46-49 and Comparative Examples 9 to 12

Liquid crystal aligning agents S-2 to S-14, S-17 to S-24, S-33 to S-36 and R-5 to R-8 were prepared in the same manner as in Example 14 except that the types of the liquid crystal aligning polyorganosiloxane and the another polymer were changed as shown in Table 3, and the storage stabilities of the agents were evaluated in the same manner as in the above Example 14. The evaluation results are shown in Table 3.

Example 28

1,000 parts by weight in terms of the polyamic acid PA-3 of the solution containing the polyamic acid PA-3 synthesized as another polymer in the above Synthesis Example 6 was collected, 100 parts by weight of the liquid crystal aligning polyorganosiloxane APS-7 synthesized in the above Example 7 was added to the solution, and further N-methyl-2-pyrrolidone and butyl cellosolve were added to prepare a solution of which a composition of N-methyl-2-pyrrolidone and butyl cellosolve is 50:50 (weight ratio) and having a solids content of 3.0 wt %. This solution was filtered with a filter having an opening diameter of 1 µm to prepare a liquid crystal aligning agent S-15 and evaluate its storage stability in the same manner as in the above Example 14. The evaluation results are shown in Table 3.

Examples 29, 38 and 39

Liquid crystal aligning agents S-16, S-25 and S-26 were prepared in the same manner as in Example 28 except that the type of the solution containing the liquid crystal aligning polyorganosiloxane and another polymer was changed as shown in Table 3 to evaluate their storage stabilities in the same manner as in the above Example 14. The evaluation results are shown in Table 3.

The amount of the another polymer was a value in terms of the polymer contained in the polymer solution used.

Example 40

500 parts by weight in terms of PS-1 of the solution containing another polysiloxane PS-1 synthesized in the above Synthesis Example 9 was collected, 100 parts by weight of the liquid crystal aligning polyorganosiloxane APS-5 synthesized in the above Example 5 was added to the solution, and further 1-ethoxy-2-propanol was added to prepare a solution having a solids content of 4.0 wt %. This solution was filtered with a filter having an opening diameter of 1 µm to prepare a liquid crystal aligning agent S-27.

The storage stability of this liquid crystal aligning agent S-27 was evaluated in the same manner as in the above Example 14. The evaluation results are shown in Table 3.

Examples 41 to 45

Liquid crystal aligning agents S-28 to S-32 were prepared in the same manner as in Example 40 except that the type of the liquid crystal aligning polyorganosiloxane was changed as shown in Table 3 to evaluate their storage stabilities in the same manner as in the above Example 14. The evaluation results are shown in Table 3.

Comparative Example 5

The polyamic acid PA-1 synthesized as the another polymer in the above Synthesis Example 4 was dissolved in a mixed solvent of N-methyl-2-pyrrolidone and butyl cellosolve (weight ratio=50:50) to prepare a solution having a solid content of 3.0 wt %. This solution was filtered with a filter having an opening diameter of 1 µm to prepare a liquid crystal aligning agent R-1.

The storage stability of this liquid crystal aligning agent R-1 was evaluated in the same manner as in the above Example 14. The evaluation results are shown in Table 3.

Comparative Examples 6 and 7

Liquid crystal aligning agents R-2 and R-3 were prepared in the same manner as in Comparative Example 5 except that the type of the another polymer was changed as shown in Table 3 to evaluate their storage stabilities in the same manner as in the above Example 14. The evaluation results are shown in Table 3.

Comparative Example 8

1-ethoxy-2-propanol was added to the solution containing another polysiloxane PS-1 synthesized in the above Synthesis Example 9 to prepare a solution having a solid content of 4.0 wt %. This solution was filtered with a filter having an opening diameter of 1 µm to prepare a liquid crystal aligning agent R-4.

The storage stability of this liquid crystal aligning agent R-4 was evaluated in the same manner as in the above Example 14. The evaluation results are shown in Table 3.

Comparative Example 13

26.4 g of ethanol was fed to a four-necked flask equipped with a reflux tube, and 10.0 g of oxalic acid was added slowly to the flask under agitation to prepare an ethanol solution of oxalic acid.

This solution was then heated up to its reflux temperature, and a mixture of 10.9 g of tetraethoxysilane and 2.45 g of octadecyltriethoxysilane was added dropwise to this solution under reflux. After the end of addition, heating was continued under reflux for 5 hours, the obtained product was cooled, and 37.5 g of butyl cellosolve was added to prepare a solution containing a polysiloxane PS-2. The content of the polysiloxane PS-2 in this solution was 4 wt % as the content of silicon in terms of $SiO_2$. This solution was filtered with a filter having an opening diameter of 1 μm to prepare a comparative liquid crystal aligning agent R-9.

The storage stability of this liquid crystal aligning agent R-9 was evaluated in the same manner as in Example 14. The evaluation results are shown in Table 3.

TABLE 3

| Name of liquid crystal aligning agent | Type of liquid crystal aligning polyorganosiloxane | Type of another polymer | Storage stability |
|---|---|---|---|
| Ex. 14 | S-1 | APS-1 | PA-1 | ◎ |
| Ex. 15 | S-2 | APS-2 | PA-1 | ◎ |
| Ex. 16 | S-3 | APS-3 | PA-1 | ◎ |
| Ex. 17 | S-4 | APS-4 | PA-1 | ◎ |
| Ex. 18 | S-5 | APS-5 | PA-1 | ◎ |
| Ex. 19 | S-6 | APS-6 | PA-1 | ◎ |
| Ex. 20 | S-7 | APS-7 | PA-1 | ◎ |
| Ex. 21 | S-8 | APS-1 | PA-2 | ◎ |
| Ex. 22 | S-9 | APS-2 | PA-2 | ◎ |
| Ex. 23 | S-10 | APS-3 | PA-2 | ◎ |
| Ex. 24 | S-11 | APS-4 | PA-2 | ◎ |
| Ex. 25 | S-12 | APS-5 | PA-2 | ◎ |
| Ex. 26 | S-13 | APS-6 | PA-2 | ◎ |
| Ex. 27 | S-14 | APS-8 | PA-2 | ◎ |
| Ex. 28 | S-15 | APS-7 | PA-3 | ◎ |
| Ex. 29 | S-16 | APS-8 | PA-3 | ◎ |
| Ex. 30 | S-17 | APS-1 | PI-1 | ◎ |
| Ex. 31 | S-18 | APS-2 | PI-1 | ◎ |
| Ex. 32 | S-19 | APS-3 | PI-1 | ◎ |
| Ex. 33 | S-20 | APS-4 | PI-1 | ◎ |
| Ex. 34 | S-21 | APS-5 | PI-1 | ◎ |
| Ex. 35 | S-22 | APS-6 | PI-1 | ◎ |
| Ex. 36 | S-23 | APS-7 | PI-1 | ◎ |
| Ex. 37 | S-24 | APS-9 | PI-1 | ◎ |
| Ex. 38 | S-25 | APS-7 | PI-1 | ◎ |
| Ex. 39 | S-26 | APS-9 | PI-1 | ◎ |
| Ex. 40 | S-27 | APS-1 | PS-1 | ○ |
| Ex. 41 | S-28 | APS-2 | PS-1 | ○ |
| Ex. 42 | S-29 | APS-3 | PS-1 | ○ |
| Ex. 43 | S-30 | APS-4 | PS-1 | ○ |
| Ex. 44 | S-31 | APS-5 | PS-1 | ○ |
| Ex. 45 | S-32 | APS-6 | PS-1 | ○ |
| Ex. 46 | S-33 | APS-10 | PA-1 | ◎ |
| Ex. 47 | S-34 | APS-11 | PI-1 | ◎ |
| Ex. 48 | S-35 | APS-12 | PA-2 | ◎ |
| Ex. 49 | S-36 | APS-13 | PA-1 | ◎ |
| C. Ex. 5 | R-1 | — | PA-1 | ◎ |
| C. Ex. 6 | R-2 | — | PA-2 | ◎ |
| C. Ex. 7 | R-3 | — | PI-1 | ◎ |
| C. Ex. 8 | R-4 | — | PS-1 | X |
| C. Ex. 9 | R-5 | RPS-1 | PA-1 | ◎ |
| C. Ex. 10 | R-6 | RPS-2 | PI-1 | ◎ |
| C. Ex. 11 | R-7 | RPS-3 | PA-2 | ◎ |
| C. Ex. 12 | R-8 | RPS-4 | PA-1 | ◎ |
| C. Ex. 13 | R-9 | — | — | X |

Ex.: Example
C. Ex.: Comparative Example

Manufacture and Evaluation of Homeotropic Alignment Type Liquid Crystal Display Device Example 50

Manufacture of Homeotropic Alignment Type Liquid Crystal Display Device

The liquid crystal aligning agent S-1 prepared in the above Example 14 was applied to the transparent electrode side of a glass substrate having a transparent electrode which was composed of an ITO film with a spinner, prebaked on a hot plate at 80° C. for 1 minute and post-baked in an oven whose inside had been substituted by nitrogen at 200° C. for 1 hour to form a coating film (liquid crystal alignment film) having a thickness of 0.1 μm. This operation was repeated to prepare a pair of (two) substrates having this liquid crystal alignment film thereon.

An epoxy resin adhesive containing aluminum oxide spheres having a diameter of 5.5 μm was applied to the peripheral portion of the liquid crystal alignment film side of one of the above substrates by screen printing, the liquid crystal alignment film sides of the pair of the substrates were joined and contact bonded together in such a manner that their rubbing directions became opposite, and the adhesive was thermally cured by heating at 150° C. for 1 hour. After negative liquid crystals (MLC-6608 of Merck KGaA) were filled into the space between the substrates from a liquid crystal injection port, the liquid crystal injection port was sealed up with an epoxy-based adhesive, and the resulting assembly was heated at 150° C. for 10 minutes and then gradually cooled to room temperature to remove flow alignment at the time of injecting the liquid crystals.

A polarizing plate was put on the outer sides of the substrates in such a manner that the polarizing directions of the two polarizing plates formed 45° from the rubbing direction of the liquid crystal alignment film and became orthogonal to each other to manufacture a homeotropic alignment type liquid crystal display device.

[Evaluation of Liquid Crystal Alignability]

The existence of an abnormal domain formed by a change in brightness when the liquid crystal display device manufactured above was turned on and off by applying and not applying a voltage of 5 V (application and cancellation of voltage) was checked with the eye.

Liquid crystal alignability was evaluated as ○ (acceptable) when light leakage from the cell was not observed at the time of not applying voltage, and a cell drive area displayed white and there was no light leakage from other areas at the time of applying voltage. Meanwhile, liquid crystal alignability was evaluated as Δ (unacceptable) when light leakage from the cell was observed at the time of not applying voltage or light leakage from other areas except for the cell drive area was observed at the time of applying voltage. The liquid crystal alignability of this liquid crystal display device was evaluated as X (out of the question) when the liquid crystals were not aligned. The liquid crystal alignability of the liquid crystal display device manufactured in this Example was evaluated as ○ (acceptable).

[Evaluation of Voltage Holding Ratio]

After a voltage of 5V was applied to the liquid crystal display device manufactured above for an application time of 60 μs and a span of 167 ms, the voltage holding ratio was measured 167 ms after the cancellation of voltage application. It was 99%. The VHR-1 of Toyo Corporation was used to measure the voltage holding ratio.

[Evaluation of Ion Density]

A 10 V, 0.01 Hz triangle wave was applied to the liquid crystal display device manufactured above, and the ion density was calculated from the area of a peak which was observed at 0 to 1 V in the obtained current-voltage waveform. It was 10 pC.

[Evaluation of Heat Resistance]

When the voltage holding ratio of a liquid crystal display device manufactured in the same manner as above was measured in the same manner as above after it was left in an oven at 100° C. for 1,000 hours, it was 85%.

[Evaluation of Light Resistance]

When the voltage holding ratio of a liquid crystal display device manufactured in the same manner as above was measured in the same manner as above after it was placed at a distance of 5 cm below a 40 W white fluorescent lamp and illuminated for 1,000 hours, it was 85%.

[Evaluation of after-Image Property]

A voltage of DC 17V was applied to a liquid crystal display device manufactured in the same manner as above in a 100° C. environment for 20 hours, and the residual voltage (residual DC voltage) in the liquid crystal cell right after DC voltage was cut off was obtained by a flicker erasing method. The residual DC voltage was 100 mV.

Examples 51 to 85 and Comparative Examples 14 to 22

Homeotropic alignment type liquid crystal display devices were manufactured in the same manner as in the above Example 50 except that liquid crystal aligning agents shown in Table 4 were used. The results are shown in Table 4.

Since the obtained liquid crystal display devices of Comparative Examples 14 to 16 had no liquid crystal alignability, other properties were not evaluated.

TABLE 4

| | | Liquid crystal display device | | | | | |
|---|---|---|---|---|---|---|---|
| | Liquid crystal aligning agent | Liquid crystal alignability | Voltage holding ratio (%) | Ion density (pC) | Heat resistance (%) | Light resistance (%) | After-image property Residual DC voltage (mV) |
| Ex. 50 | S-1 | ○ | 99 | 10 | 85 | 85 | 100 |
| Ex. 51 | S-2 | ○ | 99 | 10 | 80 | 85 | 100 |
| Ex. 52 | S-3 | ○ | 99 | 10 | 90 | 85 | 100 |
| Ex. 53 | S-4 | ○ | 99 | 10 | 85 | 85 | 100 |
| Ex. 54 | S-5 | ○ | 99 | 10 | 80 | 85 | 100 |
| Ex. 55 | S-6 | ○ | 99 | 10 | 90 | 85 | 100 |
| Ex. 56 | S-7 | ○ | 99 | 10 | 85 | 85 | 100 |
| Ex. 57 | S-8 | ○ | 99 | 10 | 85 | 85 | 100 |
| Ex. 58 | S-9 | ○ | 99 | 10 | 80 | 85 | 100 |
| Ex. 59 | S-10 | ○ | 99 | 10 | 90 | 85 | 100 |
| Ex. 60 | S-11 | ○ | 99 | 10 | 85 | 85 | 100 |
| Ex. 61 | S-12 | ○ | 99 | 10 | 80 | 85 | 100 |
| Ex. 62 | S-13 | ○ | 99 | 10 | 90 | 85 | 100 |
| Ex. 63 | S-14 | ○ | 99 | 10 | 85 | 85 | 100 |
| Ex. 64 | S-15 | ○ | 99 | 10 | 85 | 85 | 100 |
| Ex. 65 | S-16 | ○ | 99 | 10 | 85 | 85 | 100 |
| Ex. 66 | S-17 | ○ | 99 | 10 | 85 | 85 | 150 |
| Ex. 67 | S-18 | ○ | 99 | 10 | 80 | 85 | 150 |
| Ex. 68 | S-19 | ○ | 99 | 10 | 90 | 85 | 150 |
| Ex. 69 | S-20 | ○ | 99 | 10 | 85 | 85 | 150 |
| Ex. 70 | S-21 | ○ | 99 | 10 | 80 | 85 | 150 |
| Ex. 71 | S-22 | ○ | 99 | 10 | 90 | 85 | 150 |
| Ex. 72 | S-23 | ○ | 99 | 10 | 85 | 85 | 150 |
| Ex. 73 | S-24 | ○ | 99 | 10 | 85 | 85 | 150 |
| Ex. 74 | S-25 | ○ | 99 | 10 | 85 | 85 | 150 |
| Ex. 75 | S-26 | ○ | 99 | 10 | 85 | 85 | 150 |
| Ex. 76 | S-27 | ○ | 99 | 10 | 85 | 85 | 120 |
| Ex. 77 | S-28 | ○ | 99 | 10 | 80 | 85 | 120 |
| Ex. 78 | S-29 | ○ | 99 | 10 | 90 | 85 | 120 |
| Ex. 79 | S-30 | ○ | 99 | 10 | 85 | 85 | 120 |
| Ex. 80 | S-31 | ○ | 99 | 10 | 80 | 85 | 120 |
| Ex. 81 | S-32 | ○ | 99 | 10 | 90 | 85 | 120 |
| Ex. 82 | S-33 | ○ | 99 | 10 | 85 | 90 | 100 |
| Ex. 83 | S-34 | ○ | 99 | 10 | 85 | 90 | 150 |
| Ex. 84 | S-35 | ○ | 99 | 30 | 85 | 85 | 80 |
| Ex. 85 | S-36 | ○ | 99 | 30 | 85 | 85 | 80 |
| C. Ex. 14 | R-1 | X | — | — | — | — | — |
| C. Ex. 15 | R-2 | X | — | — | — | — | — |
| C. Ex. 16 | R-3 | X | — | — | — | — | — |
| C. Ex. 17 | R-4 | ○ | 99 | 20 | 90 | 90 | 120 |
| C. Ex. 18 | R-5 | Δ | 99 | 10 | 85 | 90 | 100 |

TABLE 4-continued

| | Liquid crystal display device | | | | | |
|---|---|---|---|---|---|---|
| | Liquid crystal aligning agent | Liquid crystal alignability | Voltage holding ratio (%) | Ion density (pC) | Heat resistance (%) | Light resistance (%) | After-image property Residual DC voltage (mV) |
| C. Ex. 19 | R-6 | Δ | 99 | 10 | 85 | 90 | 150 |
| C. Ex. 20 | R-7 | Δ | 99 | 30 | 85 | 85 | 80 |
| C. Ex. 21 | R-8 | Δ | 99 | 30 | 85 | 85 | 80 |
| C. Ex. 22 | R-9 | ○ | 99 | 20 | 80 | 90 | 120 |

Ex.: Example,
C. Ex.: Comparative Example

EFFECT OF THE INVENTION

The liquid crystal aligning agent of the present invention is extremely excellent in storage stability. When the liquid crystal aligning agent of the present invention is used, a liquid crystal alignment film having higher heat resistance and higher light resistance than those of an alignment film of the prior art, especially a liquid crystal alignment film which is free from the deterioration of voltage holding ratio and after-image property even when it is exposed to high-intensity light in a high-temperature environment can be obtained. Therefore, this liquid crystal alignment film formed from the liquid crystal aligning agent of the present invention can be advantageously used for the manufacture of various liquid crystal display devices.

The liquid crystal display device of the present invention comprising a liquid crystal alignment film formed from the liquid crystal aligning agent of the present invention can be advantageously used in equipment such as desk-top calculators, wristwatches, clocks, counter displays, word processors, personal computers, car navigation systems and liquid crystal TVs.

The invention claimed is:

1. A liquid crystal aligning agent comprising a liquid crystal aligning polyorganosiloxane obtained by reacting at least one reactive polyorganosiloxane selected from the group consisting of a polyorganosiloxane having a recurring unit represented by the formula (S-1), a hydrolysate thereof and a condensate of the hydrolysate,

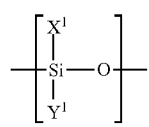
(S-1)

wherein
$X^1$ is a group having an epoxy group, and
$Y^1$ is a hydroxyl group, alkyl group having 1 to 20 carbon atoms, alkoxyl group having 1 to 10 carbon atoms or aryl group having 6 to 20 carbon atoms,
with a reactive compound including at least one compound represented by the formula (1):

(1)

wherein
$A^1$ is an alkyl group having 1 to 20 carbon atoms, cycloalkyl group having 5 to 10 carbon atoms which may optionally be substituted by an alkyl group or alkoxyl group having 1 to 20 carbon atoms, or hydrocarbon group having 17 to 51 carbon atoms and a steroid skeleton,
$L^0$ is a single bond, *—O—, *—COO— or *—OCO—, wherein the bond marked with * is bonded to $A^1$, and
$L^1$ is a single bond, phenylene group, biphenylene group, cyclohexylene group, bicyclohexylene group or group represented by the formula ($L^1$-1) or ($L^1$-2):

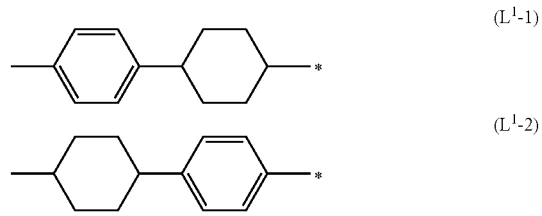

wherein the bond marked with * is bonded to Z, and
Z is a carboxyl group,
with the proviso that when $L^1$ is a single bond, $L^0$ is a single bond, and $X^1$ in the formula (S-1) and Z in the formula (1) are monovalent organic groups which may optionally be reacted with each other to form a bond group,
wherein the reactive polyorganosiloxane has a $X^1$ group content of 0.0001 to 0.02 mole/g and a weight average molecular weight in terms of polystyrene measured by gel permeation chromatography of 200 to 100,000.

2. The liquid crystal aligning agent according to claim 1, wherein $X^1$ is a group represented by the formula ($X^1$-1) or ($X^1$-2):

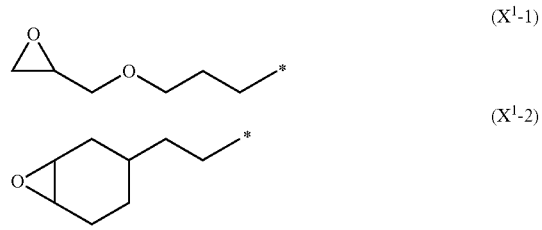

wherein * represents a bond.

3. The liquid crystal aligning agent according to claim 1 or 2, further comprising at least one polymer selected from the group consisting of a polyamic acid and a polyimide.

4. The liquid crystal aligning agent according to claim 3, wherein the at least one polymer selected from the group consisting of a polyamic acid and a polyimide is at least one polymer selected from the group consisting of a polyamic acid obtained by reacting a tetracarboxylic dianhydride including 2,3,5-tricarboxycyclopentylacetic dianhydride with a diamine and a polyimide obtained by dehydrating/ring-closing the polyamic acid.

5. The liquid crystal aligning agent according to claim 4, wherein the content of the at least one polymer selected from the group consisting of a polyamic acid and a polyimide is 100 to 50,000 parts by weight based on 100 parts by weight of the liquid crystal aligning polyorganosiloxane.

6. The liquid crystal aligning agent according to claim 1 or 2, further comprising at least one member selected from the group consisting of a polysiloxane having a recurring unit represented by the formula (S-2), a hydrolysate thereof and a condensate of the hydrolysate:

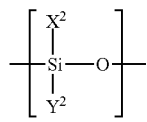

wherein
$X^2$ is a hydroxyl group, halogen atom, alkyl group having 1 to 20 carbon atoms, alkoxyl group having 1 to 6 carbon atoms or aryl group having 6 to 20 carbon atoms,
$Y^2$ is a hydroxyl group or alkoxyl group having 1 to 10 carbon atoms, and
the member selected from the group consisting of a polysiloxane having a recurring unit represented by the formula (S-2), a hydrolysate thereof and a condensate of the hydrolysate has a weight average molecular weight in terms of polystyrene measured by gel permeation chromatography of 500 to 100,000.

7. The liquid crystal aligning agent according to claim 6, wherein the content of the at least one member selected from the group consisting of a polysiloxane having a recurring unit represented by the formula (S-2), a hydrolysate thereof and a condensate of the hydrolysate is 100 to 2,000 parts by weight based on 100 parts by weight of the liquid crystal aligning polyorganosiloxane.

8. The liquid crystal aligning agent according to claim 1 or 2, wherein the reactive compound also includes at least one compound represented by the formula (2) or (3):

wherein
$A^2$ is an ethenyl group, 1-methylethenyl group or ethynyl group,
$L^2$ is a single bond, methylene group, alkylene group having 2 to 20 carbon atoms, *—COO—$(CH_2)_n$— or phenylene group,
n is an integer of 1 to 20,
the bond marked with * is bonded to $A^2$,
$A^3$ is a hydroxyl group, mercapto group, cyano group, nitro group, perfluoroalkyl group having 1 to 20 carbon atoms, perfluoroalkoxyl group having 1 to 20 carbon atoms or fluorinated phenyl group,
with the proviso that when $A^3$ is a hydroxyl group, mercapto group, cyano group or nitro group, $L^3$ is a methylene group, alkylene group having 2 to 20 carbon atoms, phenylene group or group represented by the formula:

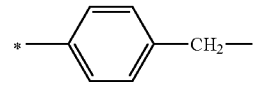

wherein the bond marked with * is bonded to $A^3$,
when $A^3$ is a perfluoroalkyl group having 1 to 20 carbon atoms, $L^3$ is a single bond or phenylene group which may optionally be substituted by a perfluoroalkyl group having 1 to 20 carbon atoms,
when $A^3$ is a perfluoroalkoxyl group having 1 to 20 carbon atoms, $L^3$ is a phenylene group, and
when $A^3$ is a fluorinated phenyl group, $L^3$ is a single bond and the fluorinated phenyl group as $L^3$ may optionally be substituted by an alkyl group having 1 to 10 carbon atoms, and
Z is a carboxyl group.

9. A liquid crystal alignment film formed from the liquid crystal aligning agent claim 1 or 2.

10. A liquid crystal display device comprising the liquid crystal alignment film of claim 9.

* * * * *